United States Patent [19]

Paris

[11] Patent Number: 4,628,505

[45] Date of Patent: Dec. 9, 1986

[54] SIGNALING TERMINAL SYSTEM FOR CCITT NO. 7 COMMON CHANNEL SIGNALING SYSTEM

[75] Inventor: Bernard Paris, Lannion, France

[73] Assignee: Compagnie Industrielle des Telecommunications Cit-Alcatel, Paris, France

[21] Appl. No.: 680,457

[22] Filed: Dec. 11, 1984

[30] Foreign Application Priority Data

Dec. 15, 1983 [FR] France .................. 83 20124

[51] Int. Cl.⁴ .................. H04J 3/02
[52] U.S. Cl. .................. 370/85; 370/110.1
[58] Field of Search .................. 370/85, 110.1, 58

[56] References Cited

U.S. PATENT DOCUMENTS

| | | | |
|---|---|---|---|
| 4,271,505 | 6/1981 | Menot et al. | 370/85 |
| 4,530,090 | 7/1985 | Priamo et al. | 370/85 |

FOREIGN PATENT DOCUMENTS

| | | | |
|---|---|---|---|
| 0062296 | 9/1981 | European Pat. Off. | |
| 58-96490 | 6/1983 | Japan | 370/85 |
| 2095077 | 9/1982 | United Kingdom | |

OTHER PUBLICATIONS

Commutation et Transmission, vol. 5, No. 3, Sep. 1983, pp. 5–24, P. Collet et al., "Introduction of CCITT No. 7 Signalling System into French Exchanges".
Review of the Electrical Communication Laboratories, vol. 28, No. 1–2, Jan. Feb. 1980, pp. 80–90, Tokyo, Japan, I. Saito et al.
Nachrichten Telefonbau und Normalzeit, No. 85, 1983, pp. 41–52, Frankfurt Main, DE, H. J. Arndgen et al.
Colloque International de Commutation, Sep. 21–25, 1981, Session 23B, Paper 2, pp. 1–8, Montreal (CA) F. Behague et al.

*Primary Examiner*—Douglas W. Olms
*Assistant Examiner*—Frank M. Scutch, III
*Attorney, Agent, or Firm*—Sughrue, Mion, Zinn, Macpeak and Seas

[57] ABSTRACT

A signaling terminal system for the CCITT No. 7 common channel signaling system comprises groups of terminals and a terminal control unit for each group. Each terminal is connected by a bidirectional link to the switching network of a telecommunication exchange. Level 3 of the exchange comprises a central control unit and a main memory. The terminals and the terminal control unit are connected to level 3 of the exchange by a system bus. Within each group, each terminal is connected to the system bus by an access circuit and to the terminal control unit by an interchange circuit. Pairs of terminals may share a common access circuit and a common interchange circuit.

6 Claims, 19 Drawing Figures

FIG.19

| # | | | | | | | |
|---|---|---|---|---|---|---|---|
| 0 | | | | | | | |
| 1 | BIB-T | | | BSN-T | | | |
| 2 | CTLSSU | ///// | ///// | ///// | FM | DM | PBE |
| 3 | FIB-T | | | FSN-T | | | |
| 4 | | | | L0 | | | |
| 5 | | | | L1 | | | |
| 6 | | | | AD0 | | | |
| 7 | | | | AD1 | | | |
| 8 | ///// | ///// | ///// | ///// | | | PZR |
| 9 | | | | ADBL0 | | | |
| 10 | | | | ADBL1 | | | |
| 11 | ITV | ITCR | ///// | ///// | ///// | | NACK |
| 12 | ///// | ///// | ///// | ///// | | LSSU | PM |
| 13 | ///// | | | FSN-R | | | |
| 14 | | | | L0/1 | | | |
| 15 | | NBZU | | ///// | ///// | | L1/1 |
| 16 | | | | PZON | | | |
| 17 | ///// | ///// | ///// | ///// | | LSSU | PM |
| 18 | ///// | | | FSN-R | | | |
| 19 | | | | L0/2 | | | |
| 20 | | NBZU | | ///// | ///// | | L1/2 |
| 21 | | | | PZON | | | |
| 22 | BIB-R | | | BSN-R | | | |
| ... | | | | | | | |
| 59 | | | | FSN-0 | | | |
| 60 | BMR | BRET | ///// | ///// | ISUERM | BVS | IAERM |
| 61 | CSM | ///// | ///// | ///// | OREC | OSUERM | CD |
| 62 | | | | OCTFOT | | | |
| 63 | ///// | ///// | ///// | ///// | ///// | ///// | ///// |

SIGNALING TERMINAL SYSTEM FOR CCITT NO. 7 COMMON CHANNEL SIGNALING SYSTEM

BACKGROUND OF THE INVENTION

1. Field of the Invention

The invention relates to the field of telecommunications and concerns a signaling terminal system for a digital communications network employing the No. 7 common channel signaling system defined by the CCITT (see Yellow Book, Fascicle VI.6—Recommendations Q.701-Q.741).

2. Description of the Prior Art

Communication systems involve the transfer of information between a subscriber and an exchange or between two exchanges. This is effected by the interchange of so-called signaling signals. If the signaling signals are transmitted on the same circuit as that used for communication, the signaling method is known as channel associated signaling. On the other hand, if the signaling signals corresponding to a group of circuits between two centers are combined together and transmitted on a separate channel, the signaling method is known as common channel signaling.

The CCITT No. 6 signaling system was the first signaling system of this kind to be specified, applied and tested. Having been originally conceived for analog applications, although subsequently modified for digital versions, the No. 6 system has limitations in a digital environment (bit rate, message length, etc.). So, to meet new requirements (digital networks), the CCITT drew up a new specification, the so-called No. 7 common channel signaling system, having a broad range of applications in dedicated and multiservice networks.

The transmission protocol employed is derived from the HDLC protocol and in this sense is related to the procedure defined in Recommendation X.25 relating to the DTE/DCE (data terminal equipment/data communication equipment) interface.

Systems using common channel signaling terminals to process protocols similar to that used in the No. 7 signaling system and providing for the connection of a number of channels are either hardwired systems (which multiplex the channels) or systems employing bit slice microprocessors. The resulting structures feature low levels of modularity and flexibility, and are difficult to use.

A general objective of the invention is to provide a signaling terminal system for the No. 7 signaling system which is flexible in use and modular in design.

SUMMARY OF THE INVENTION

The invention consists in a signaling terminal system for the No. 7 signaling system, comprising a plurality of groups of signaling terminals adapted to be connected to a telecommunication exchange's switching network, a respective terminal control unit for each of the said groups of signaling terminals, a central control unit, a main memory, a system bus connecting said signaling terminals and said terminal control units to said central control unit and said main memory, at least one access circuit connecting said signaling terminals to said system bus, and at least one interchange circuit connecting said signaling terminals to said system bus.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 19 shows one part (64 bytes) of an interchange memory of FIG. 6.

DESCRIPTION OF THE PREFERRED EMBODIMENT

Figure 1:
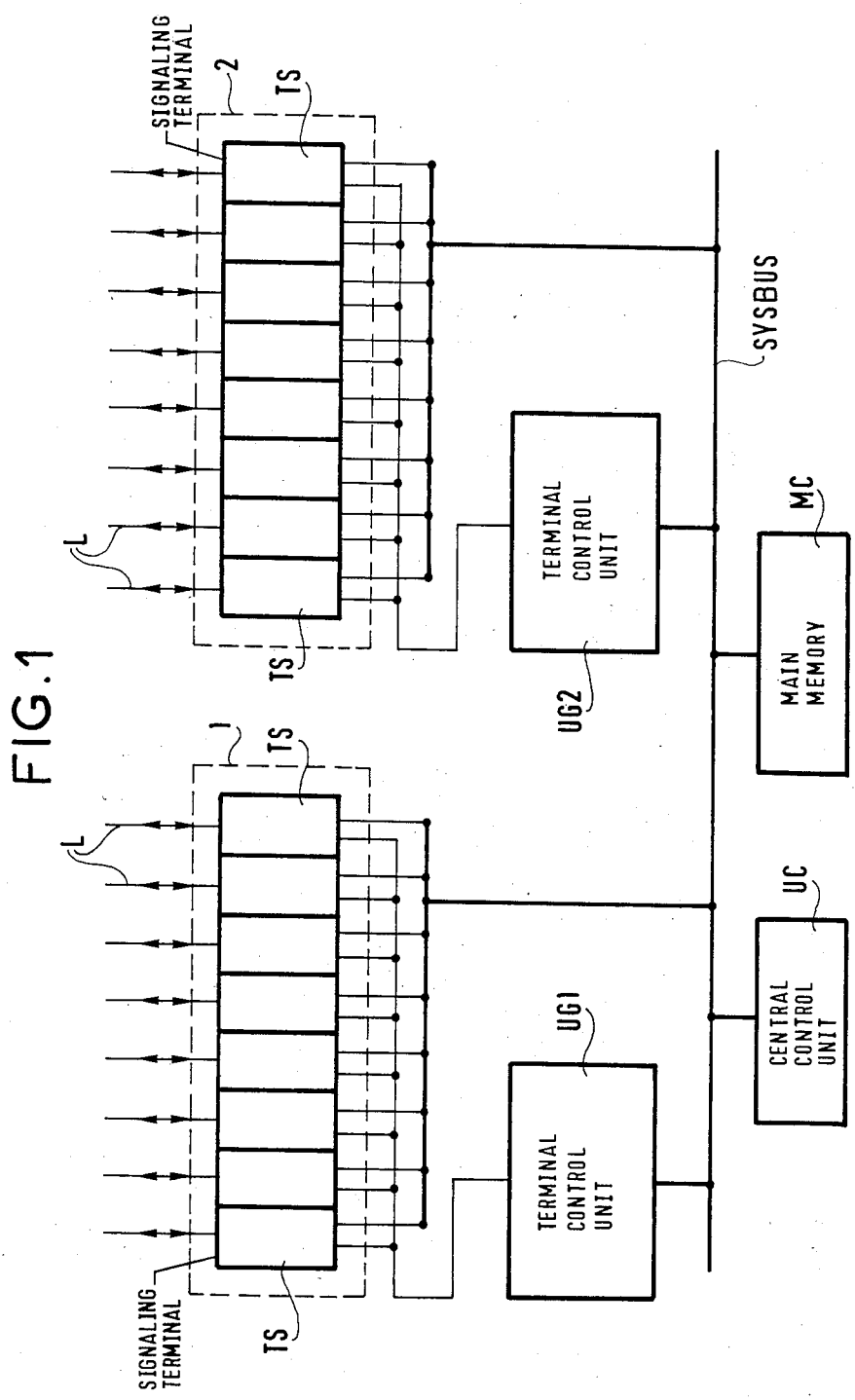
FIG. 1 is a schematic representation of a signaling terminal system to which the invention applies.

FIG. 1 is a schematic representation of a signaling terminal system to which the invention applies, implementing the level 2 functions of the CCITT No. 7 signaling system. The terminal equipment comprises two terminal groups 1 and 2 and two terminal control units UG1 and UG2. Each group of terminals comprises eight signaling terminals TS each corresponding to one transmit/receive interface to a bidirectional link L consisting of two serial links, one for the transmit direction and the other for the receive direction; each serial link operates at a bit rate of 64 kbit/s. Each of the links L is connected to a switching network through an interface which makes it possible to route to a given signaling terminal TS a time slot of one of the multiplex links which links it to the switching network and to transmit in a time slot of one of said multiplex links a message output by a signaling terminal.

Each terminal control unit UG1 and UG2 serves as an interface with level 3 of the system and controls a group of terminals. Each terminal control unit is connected to each terminal TS of the group which it controls and to a system bus SYSBUS which is in turn connected to a central control unit UC and to a main memory MC; the central control unit and the main memory form part of level 3 of the system. Each terminal TS is also connected to the system bus SYSBUS.

The main memory MC has one part reserved for the interchange of messages which is subdivided into blocks each of N bytes, with for example 10 service bytes and 30 bytes of usable information per block. This provides for optimization of the use of memory space, the blocks changing owner as messages are transferred and thus without physical movement of information. A message may be formed by a number of separate blocks strung together.

A signaling terminal TS handles fast, repetitive and byte-level processing for one signaling link, irrespective of the type of signal unit; there are three types of signal unit: message units, link status units and fill-in units. Each terminal control unit UG controls eight signaling terminals each of which handles one signaling link. For the eight signaling links, the terminal control unit handles link management, signal unit management at signal unit envelope level and management of dialog with level 3 of the system.

A signaling terminal has the following tasks: transmission and reception of signal units, management of error counters AERM (alignment error rate monitor) and SUERM (signal unit error rate monitor) when the terminal is in service, control of the received forward sequence number FSN-R, the received forward indicator bit FIB-R and the received backward sequence number BSN-R, and, finally, dialog with the terminal control unit.

Each terminal control unit has the following tasks: signaling link status supervision, initial alignment control, transmit and retransmit buffer management, retransmission procedure management, timing, management of space memory blocks in main memory, dialog with level 3 of the system and tests and observations.

Figure 2:
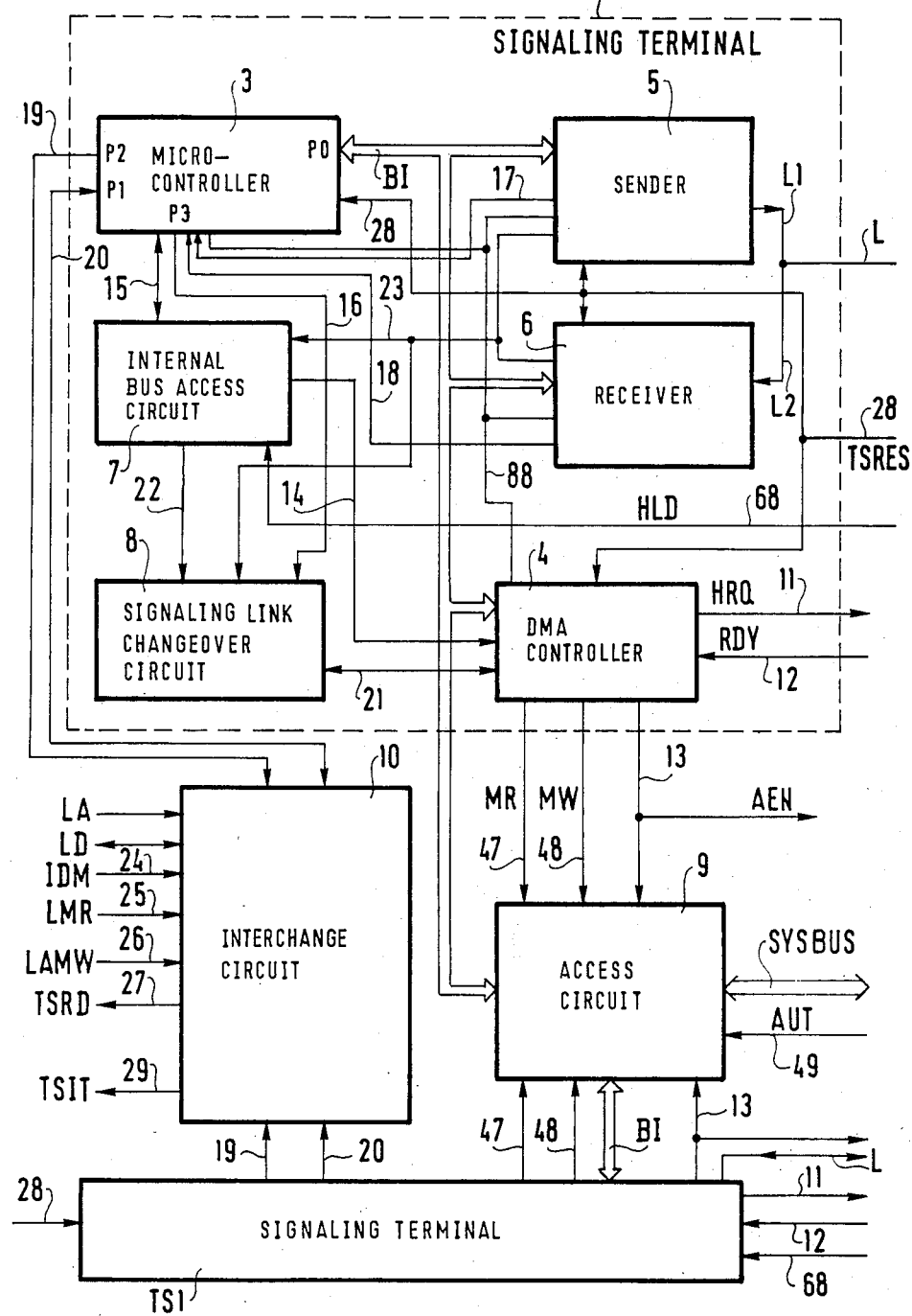
FIG. 2 shows two signaling terminals of the invention.

FIG. 2 shows, by way of example, a combination comprising two signaling terminals TS0 and TS1, an interchange circuit 10 and an access circuit 9, this combination being implemented on one printed circuit board. The terminals form part of the same group and only the terminal TS0 is shown in detail. The interchange circuit and the access circuit are common to the two terminals.

Each signaling terminal comprises a microcontroller 3, a DMA (direct memory access) controller 4, a sender 5, a receiver 6, an internal bus access circuit 7 and a signaling link changeover circuit 8. Each terminal is connected to the access circuit 9 which is in turn connected to the system bus SYSBUS and to the interchange circuit 10 which is itself connected to the terminal control unit which controls terminals TS0 and TS1.

In this embodiment, the interchange circuit 10 and access circuit 9 are common to two terminals, and it is for this reason that they are not included in the list of units 3 to 8 constituting a terminal; it will be very obvious, however, that if these circuits were not shared by two terminals, each terminal would have to comprise an interchange circuit to dialog with the terminal control unit and an access circuit to send information to and receive information from the system bus SYSBUS.

The microcontroller 3, which may consist of an 8751 integrated circuit, for example, has a first group of ports P0 connected by an internal bus BI to the DMA controller 4, to the sender 5, to the receiver 6 and to the access circuit 9, a second group of ports P1 connected to the interchange circuit 10 by a bidirectional data line 20, a third group of ports P2 connected to the interchange circuit 10 by an address line 19, and a fourth group of ports P3 connected by a link 15 to the internal bus access circuit 7, by a link 16 to the signaling link changeover circuit 8, by a transmit interrupt link 17 to the sender 5, by a receive interrupt link 18 to the receiver 6 and by a write/read link to the sender 5, to the receiver 6 and to the DMA controller 4, providing for the writing or reading of the receiver, of the sender or of the DMA controller by the microcontroller or for the reading or writing of the sender or the receiver by the DMA controller; each of groups P0 to P3 comprises eight ports. The microcontroller is connected to the terminal control unit by a reset link 28.

The signaling link changeover circuit 8 is connected to the DMA controller 4 by a link 21. The internal bus access circuit 7 is connected to the signaling link changeover circuit 8 by a link 22, to the sender 5, to the receiver 6 and to the signaling link changeover circuit 8 by a link 23, to the DMA controller 4 by a link 14 and to the terminal control unit by a link 68. The DMA controller 4, which may be an 8237.2 integrated circuit, for example, is connected by links 11, 12, 13 and 28 to the terminal control unit; it is also connected to the access circuit 9 by the link 13 and by two lines 47 and 48. The access circuit 9 is connected to the terminal control unit by a line 49.

The sender 5 and the receiver 6 may be 8273 integrated circuits, for example. The output of the sender is connected to an outgoing line L1 and the input of the receiver is connected to an incoming line L2; the incoming line L2 and outgoing line L1 constitute the bidirectional link L of FIG. 1. The sender and the receiver process messages sent and received according to the HDLC protocol.

The interchange circuit 10 is connected to the terminal control unit by an address line LA, a bidirectional data line LD and links 24, 25, 26, 27 and 29.

Each signaling terminal TS0, TS1 is connected by a reset link 28 to the terminal control unit which delivers a reset signal TSRES to the microcontroller 3, to the sender 5, to the receiver 6 and to the DMA controller 4.

Figure 3:
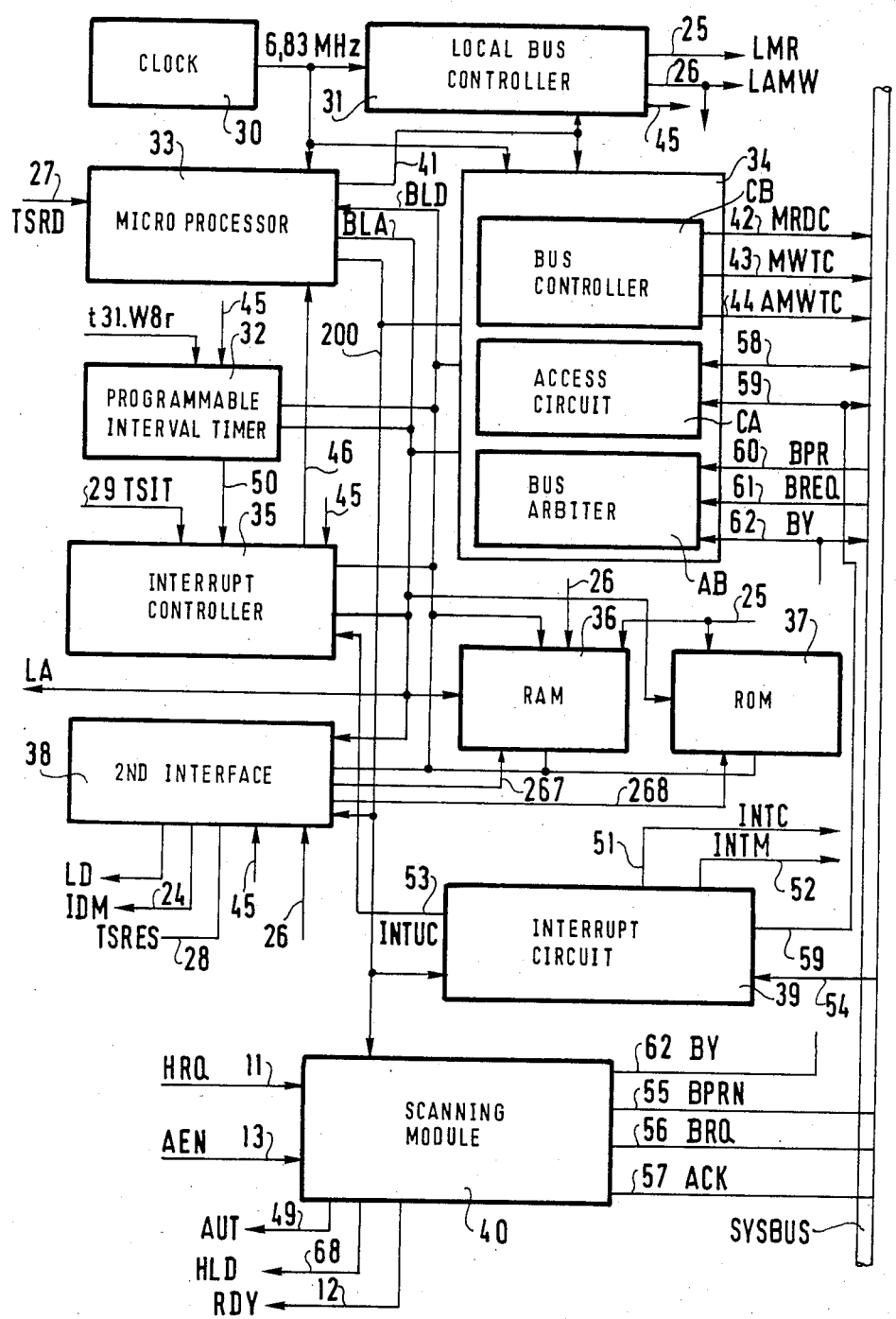
FIG. 3 shows a terminal control unit from FIG. 1.

FIG. 3 shows a terminal control unit of FIG. 1, comprising a clock 30, a local bus controller 31, a programmable interval timer 32, a microprocessor 33, a first interface 34, an interrupt controller 35, a random access memory 36, a read only memory 37, a second interface 38, an interrupt circuit 39 and a scanning module 40.

The clock 30, which may be an 8284A clock generator integrated circuit, for example, delivers a 6.83 MHz clock signal to the local bus controller 31, to the microprocessor 33 and to the first interface 34.

The microprocessor 33, which may be an 8086-2 integrated circuit, for example, is connected by a local bidirectional data bus BLD to the first interface 34, to the read only memory 37, to the random access memory 36, to the programmable interval timer 32, to the interrupt controller 35 and to the second interface 38; it is connected by a local address bus BLA to the first interface 34, to the second interface 38, to the random access memory 36, to the read only memory 37, to the programmable interval timer 32, to the interrupt controller 35 and to the address line LA which connects the terminal control unit to the signaling terminals; the microprocessor is also connected by a reset wire 200 to the scanning module 40, to the first interface 34, to the second interface 38 and to the interrupt circuit 39, and by the terminal ready link 27 to the interchange circuit 10 (FIG. 2) which delivers a terminal ready signal TSRD.

A status link 41 interconnects the microprocessor 33, the local bus controller 31 and the first interface 34. The local bus controller may be an 8288 integrated circuit, for example.

The first interface 34 comprises an access circuit CA, a bus controller CB which may be an 8288 integrated circuit, for example, and a bus arbiter AB which may be an 8289 integrated circuit, for example. The bus controller CB is connected to the system bus SYSBUS by three links 42, 43 and 44. The bus arbiter AB is connected to the system bus SYSBUS by three links 60, 61 and 62, the link 62 being bidirectional. The access circuit CA is connected to the system bus SYSBUS by a data link 58 and an address link 59.

The local bus controller 31 is connected by the links 25 and 26 to the interchange circuit 10 of FIG. 2, by the link 26 and a write signal line 45 to the second interface 38, to the programmable interval timer and to the interrupt controller 35 by the line 45, to the random access memory 36 and the read only memory 37 by the link 25 and to the random access memory 36 by the link 26.

The programmable interval timer 32, which may be an 8253 integrated circuit, for example, comprises three programmable counters; it receives a clock signal t31 w 8 r and its output is connected by a link 50 to the interrupt controller 35 which is an 8259A integrated circuit connected by the link 29 to the interchange circuit 10 of FIG. 2 and by a line 46 to the microprocessor 33.

The read only memory 37 has a capacity of 8,000 words each of 16 bits and the random access memory 36 has a capacity of 2,000 words each of 16 bits.

The second interface 38 is connected to the interchange circuit 10 of FIG. 2 by the data line LD and the link 24, to the random access memory 36 by a wire 267 and to the read only memory 37 by a wire 268, and to the signaling terminals by the link 28.

The interrupt circuit 39 is connected to the system bus SYSBUS by the link 59, to the level 3 central control unit UC by two links 51 and 52, to the interrupt controller 35 by a link 53, to the system bus SYSBUS by the link 54 and to the wire 200.

The scanning module 40 is connected to the terminals TS by the links 11, 12, 13 and 68 and the line 49; it is connected to the system bus SYSBUS by the links 55, 56, 57 and 62.

Figure 4:
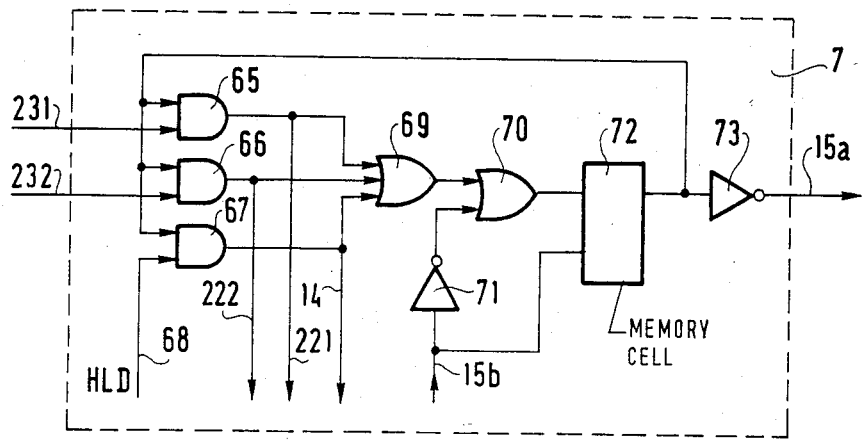
FIG. 4 shows an internal bus access circuit of one signaling terminal of FIG. 2.

FIG. 4 shows the internal bus access circuit 7 of FIG. 2.

An AND gate 65 has one input connected to the sender 5 by the wire 231 and an AND gate 66 has one input connected to the receiver 6 by the wire 232; the wires 231 and 232 form part of the link 23 in FIG. 2, and the AND gates 65 and 66 respectively receive a transmit transfer request and a receive transfer request over the wires 231, 232. An AND gate 67 has one input connected to the link 68 over which it receives from the terminal control unit (FIG. 3) an acknowledge signal HLD following a transfer request from the DMA controller 4. The output of the AND gate 65 is connected to one input of an OR gate 69 and to a wire 221; the output of the AND gate 66 is connected to another input of the OR gate 69 and to a wire 222; the wires 221 and 222 constitute the link 22 of FIG. 2. The output of the AND gate 67 is connected to another input of the OR gate 69 and to the link 14. The output of the OR gate 69 is connected to one input of an OR gate 70 which has another input connected through an inverter 71 to a wire 15b; the output of the OR gate 70 is connected to the "set to 1" input of a memory cell 72 which has its "set to 0" input connected to the wire 15b. The output of the memory cell 72 is connected to one input of each of AND gates 65, 66 and 67 and to a wire 15a through an inverter 73. The wires 15a and 15b constitute the link 15 of FIG. 2, the wire 15a being connected to port 0 and the wire 15b to port 1 of the fourth group of ports P3 of the microcontroller 3. The microcontroller 3 has no HOLD function, which means that when the DMA controller 4 executes a transfer on the internal bus BI it cannot disable the microcontroller. The internal bus access circuit 7 is used to resolve such conflicts. Each time that the microcontroller has to access the internal bus it requests such access on the wire 15b; it waits for its port 0 connected to the wire 15a to be set to 1 before accessing the internal bus, as this indicates that there is no request from the sender 5 or the receiver 6 at this time; as soon as the microcontroller has access to the internal bus, the AND gates 65, 66 and 67 are disabled so that neither the sender nor the receiver can send a transfer request to the DMA controller 4.

In the absence of any internal bus BI request from the microcontroller 3, a transfer request emitted by the sender 5 on the wire 231 is routed by the wire 221 to the signaling link changeover circuit 8, whereas a transfer request emitted by the receiver 6 on the wire 232 is routed to the signaling link changeover circuit 8.

Figure 5:
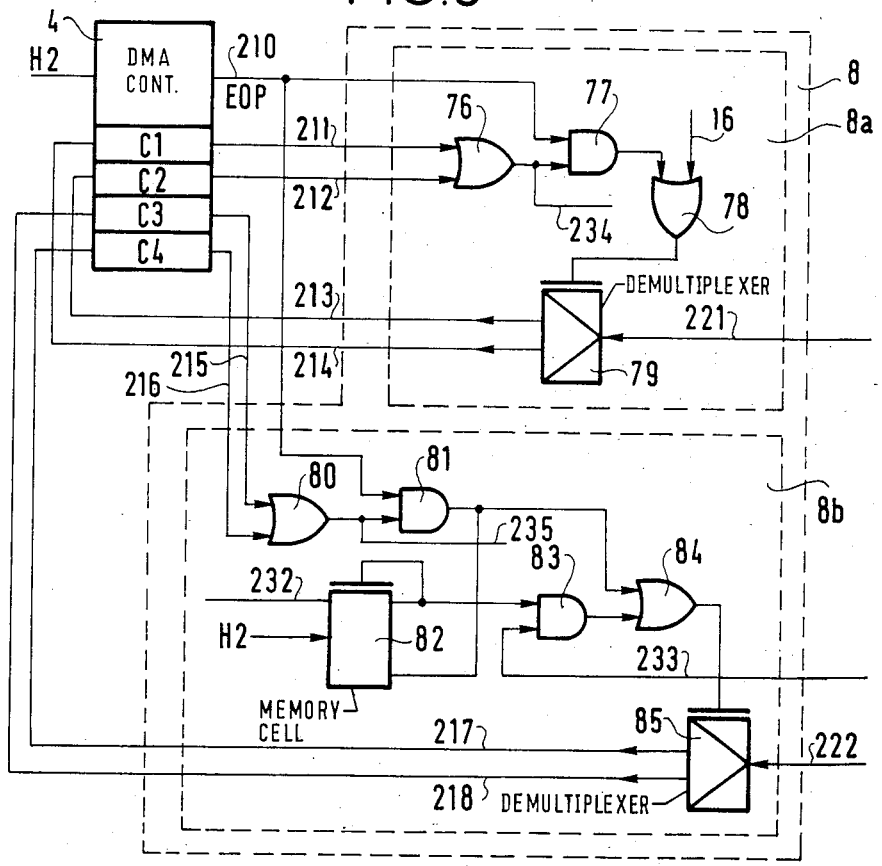
FIG. 5 shows a signaling link changeover circuit of one signaling terminal of FIG. 2.

FIG. 5 shows the signaling link changeover circuit 8 of FIG. 2, consisting of a transmit changeover circuit 8a and a receive changeover circuit 8b; FIG. 5 also shows the DMA controller 4 which comprises four signaling links C1, C2, C3 and C4.

In the circuit 8a an OR gate 76 has respective inputs connected to the outputs of signaling links C1 and C2 by wires 211 and 212, an AND gate 77 has one input connected by the wire 210 to an output of the DMA controller 4 which delivers an end of process signal EOP and another input connected to the output of the OR gate 76. An OR gate 78 has one input connected to the output of the AND gate 77 and another input connected by the link 16 to the microcontroller 3 from which it receives a write signal; the output of the OR gate 78 is connected to a control input of a demultiplexer 79 which has its input connected to the wire 221 of FIG. 4; an output of the demultiplexer is connected by a wire 213 to the input of signaling link C2 and another output is connected by a wire 214 to the input of signaling link C1. The output of the OR gate 76 is also connected to the sender 5 by a wire 234 which transmits an end of transfer acknowledge signal.

In the circuit 8b, an OR gate 80 has respective inputs connected to the outputs of signaling links C3 and C4 by wires 215 and 216; an AND gate 81 has one input connected to the wire 210 and another input connected to the output of the OR gate 80. A memory cell 82 has its input connected by the wire 232 to the receiver 6 and its clock input receives a clock signal H2 which is the same as that supplied to the DMA controller 4; its reset input is connected to the output of the AND gate 81 and its output is connected to an input of an AND gate 83 of which another input is connected by a wire 233 to the receiver 6 and receives an interrupt signal from it when reception of a message has terminated and the message length is not a multiple of 30 bytes; an OR gate 84 has respective inputs connected to the outputs of AND gates 81 and 83 and its output is connected to a control input of a demultiplexer 85 the input of which is connected to the wire 222 of FIG. 4; an output of the demultiplexer is connected by a wire 217 to the input of signaling link C4 and another input is connected by a wire 218 to the input of signaling link C3. The output of the OR gate 80 is also connected to the receiver 5 by a wire 235 which transmits an end of transfer acknowledge signal to the DMA controller.

The wires 210, 211, 212, 213, 214, 215, 216, 217 and 218 constitute the link 21 of FIG. 2, the wires 221 and 222 constitute the link 22 and the wires 232, 233, 234 and 235 constitute with the wire 231 of FIG. 4 the link 23 of FIG. 2.

When the DMA controller 4 delivers on the wire 210 an end of process signal EOP, this indicates that the number of transfers for a signaling link has reached the maximum number of transfers authorized, this number being set at 30 (bytes), for example. On transmission, the association of the signals transmitted via signaling links C1 and C2 on wires 211 and 212 with the end of process signal on wire 210 makes it possible to identify the signaling link which must be changed over, which provides for routing the transfer rrequest signal from the sender over the wire 221 from the internal bus access circuit 7 of FIG. 4 to the input of one of the signaling links C1 or C2. The changeover which therefore occurs after transmission of a block of 30 bytes may also be commanded by the microcontroller 3 which in this case delivers a signal to the OR gate 78 by means of the wire 16. On reception, the association of the signals transmitted via signaling links C3 and C4 on the wires 215 and 216 with the end of process signal on wire 210 makes it possible to route the transfer request signal from the receiver and sent over the wire 222 from the internal bus access circuit 7 to the input of one of signaling links C3 and C4. Changeover occurs after reception of a block of 30 bytes; it also occurs if the end of reception of a message is indicated by the receiver over wire 233 and the message length is not a multiple of 30 bytes, changeover having occurred already if the message length is a multiple of 30 bytes.

Figure 6:
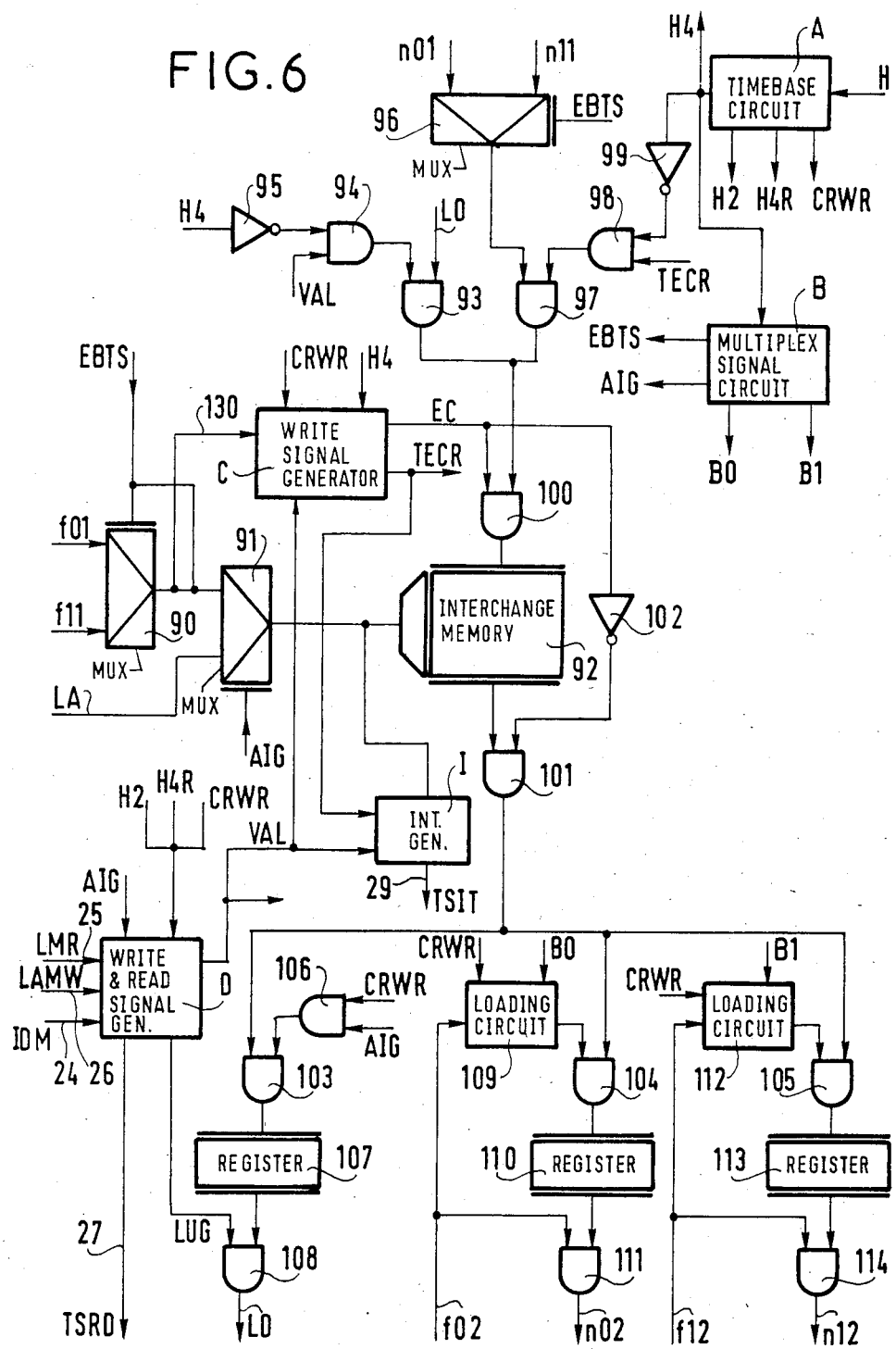
FIG. 6 shows an interchange circuit communicating with the terminal control unit of FIG. 2.

FIG. 6 shows the interchange circuit 10 of FIG. 2.

It comprises a timebase circuit A, a multiplex circuit B, a write signal generator C, a write and read signal generator D, an interrupt generator I and two loading circuits 109 and 112; all these circuits will be further described later. Fom a 10 MHz clock signal H provided by the telecommunication exchange, the time-base A derives timing signals H2, H4 and H4R and a write timing generation signal CRWR. The multiplex signal circuit B derives from the timing signal H4 two select signals EBTS and AIG and two control signals B0 and B1. The write signal generator receives the timing signal H4 and the write timing generation signal CRWR. The write and read signal generation circuit D receives the timing signals H2 and H4R, the write timing generation signal CRWR and the select signal AIG. The loading circuit 109 receives the control signal B0 and the write timing generation signal CRWR and the loading circuit 112 receives the control signal B1 and the write timing generation signal CRWR.

In FIG. 6, a multiplexer 90 has an input connected by a link f01 to the signaling terminal TS0 and an input connected by a link f11 to the signaling terminal TS1; the links f01 and f11 are connected to ports 0 to 6 of the third groups of ports P2 of the microcontrollers 3 of the signaling terminals of FIG. 2; the select signal EBTS delivered by the multiplex circuit B is applied to the select input of the multiplexer 90 and has the value 0 for terminal TS0 and the value 1 for terminal TS1.

The signal EBTS is also applied to one input of a multiplexer 91 which is also connected to the output of the multiplexer 90 from which it receives the six address bits 0 to 5, the seventh bit being applied over a wire 130 to the write signal generator C; another input of the multiplexer 91 is connected to the terminal control unit controlling the terminals TS0 and TS1 by the address line LA. The select signal AIG delivered by the multiplex circuit B is applied to the select input of the multiplexer 91 and has the value 0 for a terminal TS0 or TS1 and the value 1 for the terminal control unit, so as to route to the output of the multiplexer 91 either an address from the multiplexer 90 or an address for the terminal control unit.

The output of the multiplexer 91 is connected to the addressing circuit of an interchange memory 92, which has one part assigned to the signaling terminal TS0 and another part assigned to the signaling terminal TS1.

The data line LD is connected to one input of an AND gate 93 which has another input connected to the output of an AND gate 94; the AND gate 94 has one input which receives a timing signal H4 from the timebase A through an inverter 95 and another input which receives a write enable signal VAL from the write and read timing circuit D. A 2-input multiplexer 96 is connected to the second groups of ports P1 of the microcontrollers 3 of the terminals TS0 and TS1 by the links n01 and n11, respectively; a select input of the multiplexer 96 receives the select signal EBTS. The output of the multiplexer 96 is connected to one input of an AND gate 97 which has another input connected to the output of an AND gate 98; the AND gate 98 has one input connected to an inverter 99 which receives the timing signal H4 from the timebase A and another input which receives a write enable signal TECR from the write signal generator C. The outputs of the AND gates 93 and 97 are connected to one input of an AND gate 100 which has another input receiving a write timing signal EC from the write signal generator C; the output of the AND gate 100 is connected to the input of the interchange memory 92.

The output of the interchange memory 92 is connected to one input of an AND gate 101 which has another input receiving the write timing signal EC through an inverter 102; the output of the AND gate 101 is connected to one input of three AND gates 103, 104 and 105.

Another input of the AND gate 103 is connected to the output of an AND gate 106 which receives on one input the select signal AIG and on another input the write timing generator signal CRWR delivered by the timebase A; the output of the AND gate 103 is connected to the input of the register 107. An AND gate 108 has one input connected to the output of the register 107 and receives on another input a read signal LUG from the write and read timing circuit D; the output of the AND gate 108 is connected to the data line LD.

The AND gate 104 has another input connected to the loading circuit 109 which has its input connected by a link f02 to the eighth port of the third group of ports P2 of the microcontroller 3 of the signaling terminal TS0; the output of the AND gate 104 is connected to the input of a register 110. An AND gate 111 has one input connected to the output of the register 110 and another input connected to the link f02; the output of the AND gate 111 is connected to the second group of ports P1 of the signaling terminal TS0 by a link n02.

The AND gate 105 has another input connected to the loading circuit 112 which has an input connected by a link f12 to the eighth port of the third group of ports P2 of the microcontroller 3 of the signaling terminal TS1; the output of the AND gate 105 is connected to the input of a register 113. An AND gate 114 has one input connected to the output of the register 113 and another input connected to the link f12; the output of the AND gate 114 is connected to the second group of ports P1 of the signaling terminal TS1 by a link n12.

The links f01 and f02 constitute the address line 19 connecting the signaling terminal TS0 to the interchange circuit 10; similarly, the links n01 and n02 constitute the data line 20 connecting the signaling terminal TS0 to the interchange circuit.

The links f11 and f12 constitute the address line 19 and the links n11 and n12 constitute the data line 20 connecting the signaling terminal TS1 to the interchange circuit 10.

The interrupt generator I is connected to the output of the multiplexer 91 from which it receives address bits 0 to 5; it also receives the write enable signal VAL and the write enable signal TECR; it delivers an interrupt signal TSIT on the interrupt link 29.

The interchange memory 92 is addressed either by a terminal (TS0 or TS1) or by the terminal control unit over the address line LA, the multiplexer 91 being controlled by the select signal AIG; the terminal is selected by the multiplexer 90 according to the select signal EBTS which also constitutes bit 6 of the address delivered by the multiplexer 90 to the multiplexer 91, this bit 6 providing for the addressing of the part of the interchange memory assigned to the terminal selected. On writing the interchange memory, the data line LD or a terminal (TS0 or TS1) is selected either by the write enable signal VAL which validates the data from the terminal control unit (AND gate 93) or by the write enable signal TECR which validates the data from a terminal (AND gate 97), the terminal being selected by the multiplexer 96 according to the select signal EBTS. Writing in the interchange memory is controlled by the write timing signal EC which enables the AND gate 100 and disables the AND gate 101; reading of the interchange memory via the AND gate 101 is thus enabled at all times except when the write timing signal EC is active. The registers 107, 110 and 113 are used to route data read from the interchange memory to the terminal control unit or to terminal TS0 or to terminal TS1, respectively. Writing in register 107 is controlled by the select signal AIG and the write timing generation signal CRWR, and reading is controlled by the read signal LUG. According to whether the data read from the interchange memory is intended for terminal TS0 or TS1, loading circuit 109 or 112 is activated by the control signal B0 or B1 to load the corresponding register 110 or 113; the register is read by means of bit 7 from the eighth port of the third group of ports P2 of the microcontroller 3 of the corresponding terminal.

Figure 7:
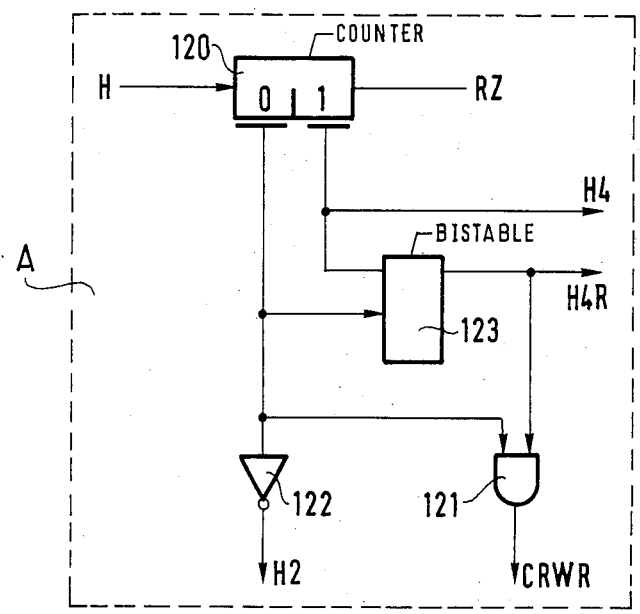
FIG. 7 shows a timebase of FIG. 6.

FIG. 7 shows the timebase A from FIG. 6.

A 2-bit counter 120 receives the 10 MHz clock signal H; it is reset to zero (wire RZ) when the equipment is powered up. The first bit (bit 0) output is connected to one input of an AND gate 121, to an inverter 122 which delivers at its output the signal H2 and to a clock input of a bistable 123; the second bit (bit 1) output delivers the signal H4 and is connected to the signal input of the bistable 123; the output of the bistable 123 delivers the signal H4R and is connected to another input of the AND gate 121 which delivers the write timing generation signal CRWR. The signal H4R is the signal H4 retarded by a quarter of its period. The signal H2 is used also as a clock by the DMA controller 4 of the signaling terminal.

Figure 8:
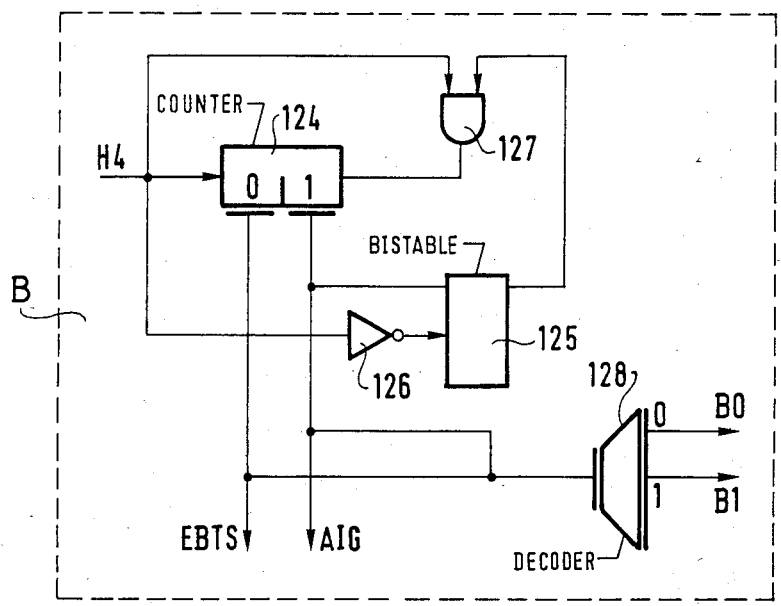
FIG. 8 shows a multiplex signal circuit of FIG. 6.

FIG. 8 shows the multiplex signal circuit B from FIG. 6. A 2-bit counter 124 receives the timing signal H4 from the timebase A. The first bit (bit 0) output of the counter delivers the select signal EBTS which is applied to the multiplexers 90 and 96 of FIG. 6; when its value is 0 this signal provides for routing the addresses delivered by the terminal TS0 to the output of the multiplexers; when this signal has the value 1 it provides for routing the addresses delivered by the terminal TS1 to the output of the multiplexers. The second bit (bit 1) output of the counter 124 delivers the select signal AIG which is applied to the multiplexer 91 and to the gate 106 of FIG. 6; when it has the value 0 this signal provides for routing the output of the multiplexer 90 to the output of the multiplexer 91; when it has the value 1 this signal provides for routing the addresses on the address line LA to the output of the multiplexer 91. A bistable 125 has its input connected to the second bit output of the counter 124 and its control input receives through an inverter 126 the timing signal H4; the output of the bistable 125 is connected to one input of an AND gate 127 of which another input receives the timing signal H4; the output of the AND gate 127 is connected to the reset input of the counter 124. Thus the counter is reset to zero after counter state 10 is decoded and on the rising edge of the timing signal H4 following such decoding, which corresponds to the select signal AIG; thus this counter has three states: 00, 01, 10. Both the outputs of the counter are connected to a decoder 128 which decodes the values 0 and 1, respectively designating the signaling terminals TS0 and TS1, and delivers for the value 0 the control signal B0 and for the value 1 the control signal B1, these signals controlling the loading circuits 109 and 112 of FIG. 6, respectively.

Figure 9:
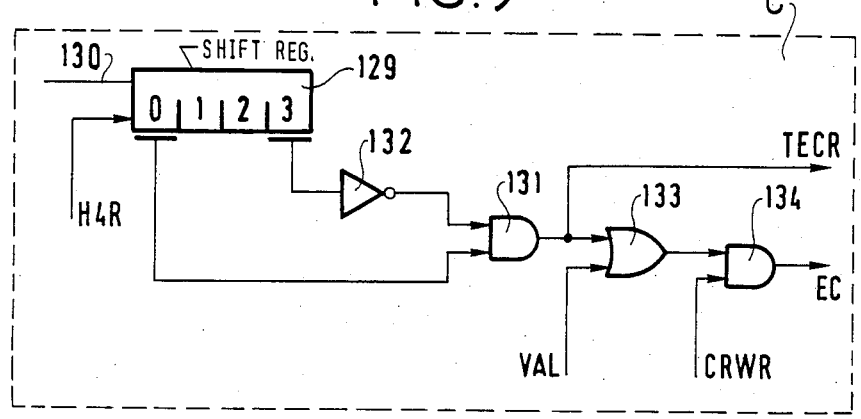
FIG. 9 shows a write signal generator of FIG. 6.

FIG. 9 shows the write signal generator C from FIG. 6. A shift register 129 has a serial input connected by the wire 130 to the output of the multiplexer 90; this wire 130 corresponds to the seventh bit of the address delivered by the third groups of ports P2 of the microcontrollers 3 of the signaling terminals TS0 and TS1. The shift input of the register receives the timing signal H4R. The first bit (bit 0) output of the register is connected to one input of an AND gate 131; the fourth bit (bit 3) output of the register is connected through an inverter 132 to another input of the AND gate 131, the output of which delivers the write enable signal TECR and is connected to one input of an OR gate 133; another input of the OR gate 133 receives the write enable signal VAL which is delivered by the write and read signal generation circuit D of FIG. 6.

The output of the OR gate 133 is connected to one input of an AND gate 134 of which another input receives the write timing generation signal CRWR delivered by the timebase A; the AND gate 134 delivers the write timing signal EC.

The write signal generator C provides for detection of the 0 to 1 transition on the seventh bit of the address delivered by the two signaling terminals TS0 and TS1 and for delivering the write timing signal EC in the access interval of the terminal considered. For example, access is enabled for the terminal TS0 on an edge of the timing signal H4, which gives (FIG. 8) EBTS=0 and B0=1; the subsequent rising edge of the timing signal H4R samples the seventh bit (wire 130) from the terminal TS0 and compares its value with the previously sampled value of this bit in the access period of the terminal TS0. If the combination 0, 1 (bit 0 at 1 and bit 3 at 0) is found in the register, the AND gate 131 delivers the write enable signal TECR and the AND gate 134 delivers the write timing signal EC. For writing the data delivered by the terminal control unit, it is the write enable signal VAL delivered by the write and read signal generation circuit D which is transmitted by the OR gate 133 to the AND gate 134 which delivers the write signal EC.

Figure 10:
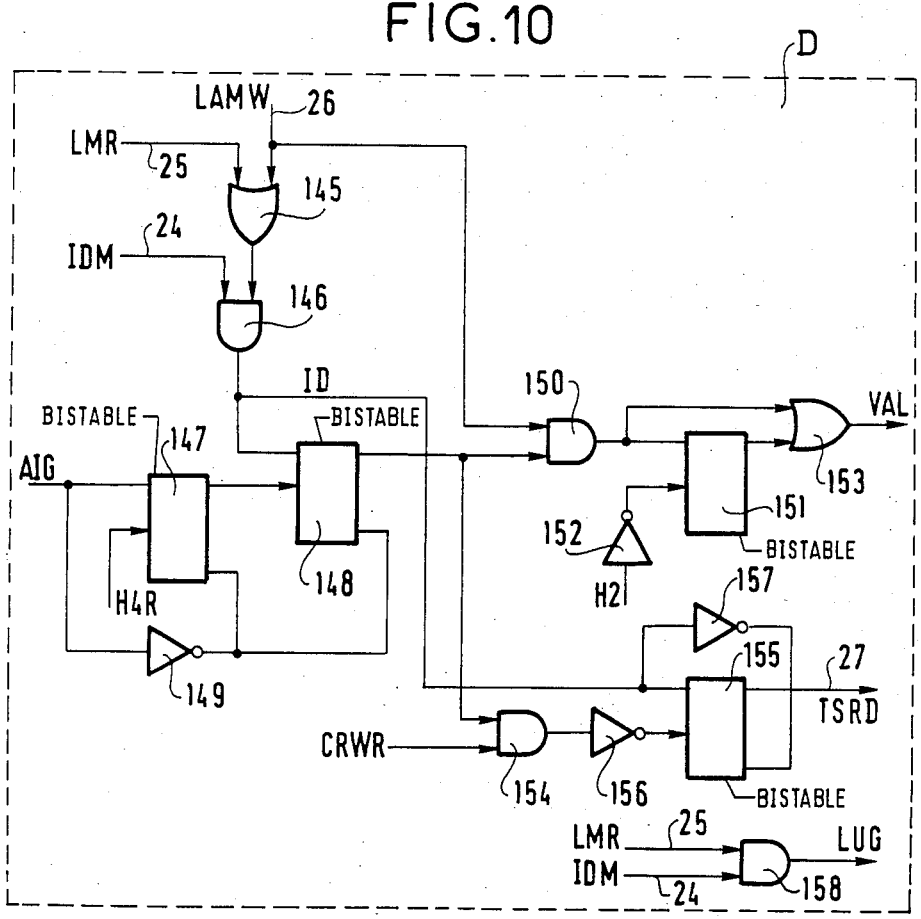
FIG. 10 shows a circuit of the interchange circuit of FIG. 6 generating write and read signals.

FIG. 10 shows the write and read signal generation circuit D from FIG. 6. An OR gate 145 has one input connected to the read control link 25 over which it receives a read control signal LMR, and another input connected to the write control link 26 over which it receives a write control signal LAMW, the read and write signals coming from the terminal control unit; an AND gate 146 has one input connected to the output of the OR gate 145 and another input connected to the decode control line 24 over which it receives a decode control signal IDM; a bistable 147 receives on its input the select signal AIG and on its clock input the timing signal H4R; a bistable 148 has its signal input connected to the output of the AND gate 146 and its clock input connected to the output of the bistable 147; the select signal AIG is applied through an inverter 149 to the reset input of each of the bistables 147 and 148. An AND gate 150 has one input connected to the link 26 and another input connected to the output of the bistable 148. The bistable 151 has its signal input connected to the output of the AND gate 150 and its clock input receives through an inverter 152 the timing signal H2; an OR gate 153 has one input connected to the output of the AND gate 150 and another input connected to the output of the bistable 151; the OR gate 153 delivers the write enable signal VAL to the write signal generator C and to the interrupt generator I. An AND gate 154 has one input connected to the output of the bistable 148 and receives on another input the write timing generation signal CRWR; a bistable 155 has its signal input connected to the output of the AND gate 146, its clock input connected through an inverter 156 to the output of the AND gate 154, and its reset input connected through an inverter 157 to its signal input; the output of the bistable 155 is connected to the terminal control unit by the terminal ready link 27 over which it delivers the ready signal TSRD when action on the interchange memory 92 is enabled. A 2-input AND gate 158 is connected to the terminal control unit by the links 24 and 25 over which it receives the decode signal IDM and the read signal LMR; the AND gate 158 delivers at its output the read signal LUG authorising reading of the register 107 (FIG. 6).

The write and read signal generation circuit D generates the timing signals used by the terminal control unit to read and write the interchange memory 92. Write and read detection are achieved by sampling from signal H4R in the period of the select signal AIG, when it selects the terminal control unit, that is to say when it has the value 1, as indicated in the description of FIG. 8. The sampled signal ID is that delivered by the AND gate 146, the bistable 148 then delivering a signal synchronous with the timing signal H4R. If the signal delivered by the bistable 148 is enabled by the write control signal LAMW (AND gate 150) this indicates that there is a write request from the terminal control unit UG; the AND gate 150 then delivers the write enable signal to the OR gate 153, the bistable 151 providing for prolonging this signal, the signal VAL delivered by the OR gate 153 being applied to the write signal generator C which delivers the write timing signal EC. In the case of a read request by the terminal control unit UG, the AND gate 158 delivers the read signal LUG to the register 107 (FIG. 6); this register is loaded during the timing interval CRWR.AIG which enables the AND gate 103, the interchange memory 92 being still in read mode, via the AND gate 101 except during the write interval corresponding to the write timing signal EC. The bistable 155 (FIG. 10) delivers the terminal ready signal TSRD when the write timing generation signal CRWR returns to zero; on receiving the terminal ready signal the terminal control unit resets to zero the corresponding write or read signal LAMW or LMR, according to whether it was a write or read request, which resets the terminal ready signal TSRD.

Figure 11:
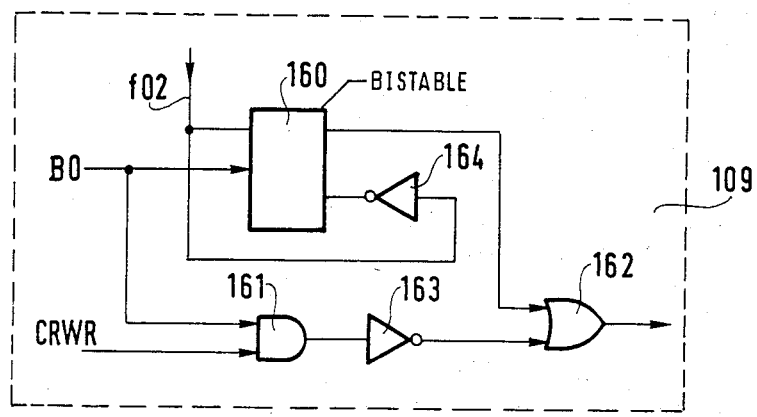
FIG. 11 shows a loading circuit of FIG. 6.

FIG. 11 shows the loading circuit 109 from FIG. 6. A bistable 160 has its signal input connected by the link f02 to the eighth port of the third group of ports P2 of the microcontroller 3 of the signaling terminal TS0; the bit delivered by the eighth port corresponding to a register 110 read signal enables the AND gate 111 of FIG. 6; the clock input of the bistable is connected to the multiplex signal circuit B from which it receives the control signal B0; an AND gate 161 receives the signal B0 on one input and the write timing generation signal CRWR on another input; an OR gate 162 has one input connected to the output of the bistable 160 and another input connected by an inverter 163 to the output of the AND gate 161; the bistable 160 has its reset input connected by an inverter 164 to the wire f02; the output of the OR gate 162 is connected to one input of the AND gate 104 of FIG. 6. The OR gate 162 delivers a loading pulse when the signal CRWR returns to zero, provided of course that the signal B0 is present, this signal relating to the signaling terminal TS0. When the microcontroller 3 delivers a read signal from the eighth port of the third group of ports P2, over the link f02, for reading the register 110, and if this bit is sent within the period of signal B0, loading of register 110 must be disabled; it is the signal delivered by the bistable 160 which disables loading, the OR gate 162 no longer being able then to deliver the loading pulse from signals B0 and CRWR when the latter returns to zero.

Figure 12:
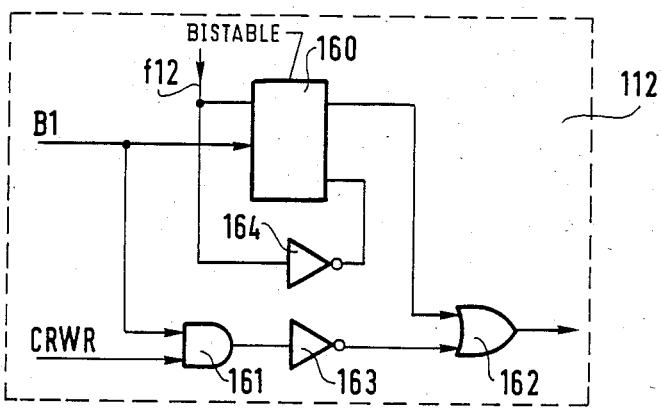
FIG. 12 shows another loading circuit of FIG. 6.

FIG. 12 shows the loading circuit 112 from FIG. 6. This circuit is identical to that of FIG. 11, except that the signal input of the bistable 160 is connected by the link f12 to the eighth port of the third group of ports P2 of the microcontroller 3 of the signaling terminal TS1 and the clock input of the bistable 160 and one input of the AND gate 161 receive from the multiplex signal circuit B the control signal B1; the output of the OR gate 162 is connected to one input of the AND gate 105 of FIG. 6.

Figure 13:
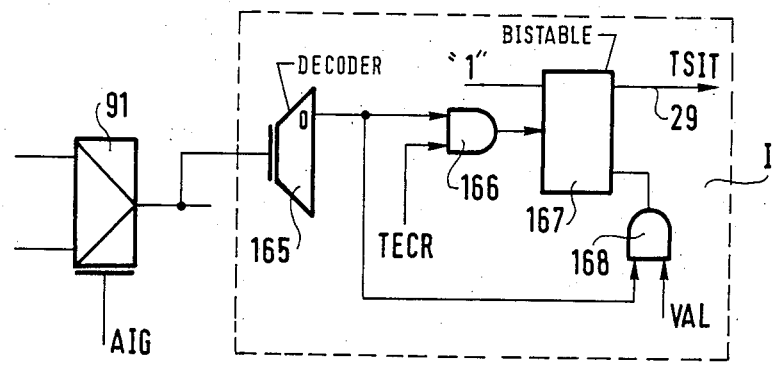
FIG. 13 shows an interrupt generator circuit of FIG. 6.

FIG. 13 shows the interrupt generator circuit I from FIG. 6. A decoder 165 is connected to the output of the multiplexer 91 of FIG. 6, from which it receives address bits 0 to 5; this decoder decodes at its output the number 0 which is delivered to one input of an AND gate 166 and to one input of an AND gate 168. Another input of the AND gate 166 receives the write enable signal TECR from the write signal generator C; the bistable 167 has a signal input which receives a signal with the value 1 at all times, a clock input connected to the output of the AND gate 166 and a reset input RZ connected to the output of the AND gate 168 which receives on another input the write enable signal VAL from the write and read timing circuit D of FIG. 6. The bistable 167 delivers an interrupt signal TSIT to the terminal control unit over the link 29. This interrupt signal is thus delivered when the six bits 0 to 5 of an address have the value zero, this address being delivered by a signaling terminal TS0 or TS1, and this signal is reset on decoding the same address delivered this time by the terminal control unit. Thus when a terminal has to alert the terminal control unit it writes at address 0, which results in the sending of an interrupt to the terminal control unit.

Figure 14:
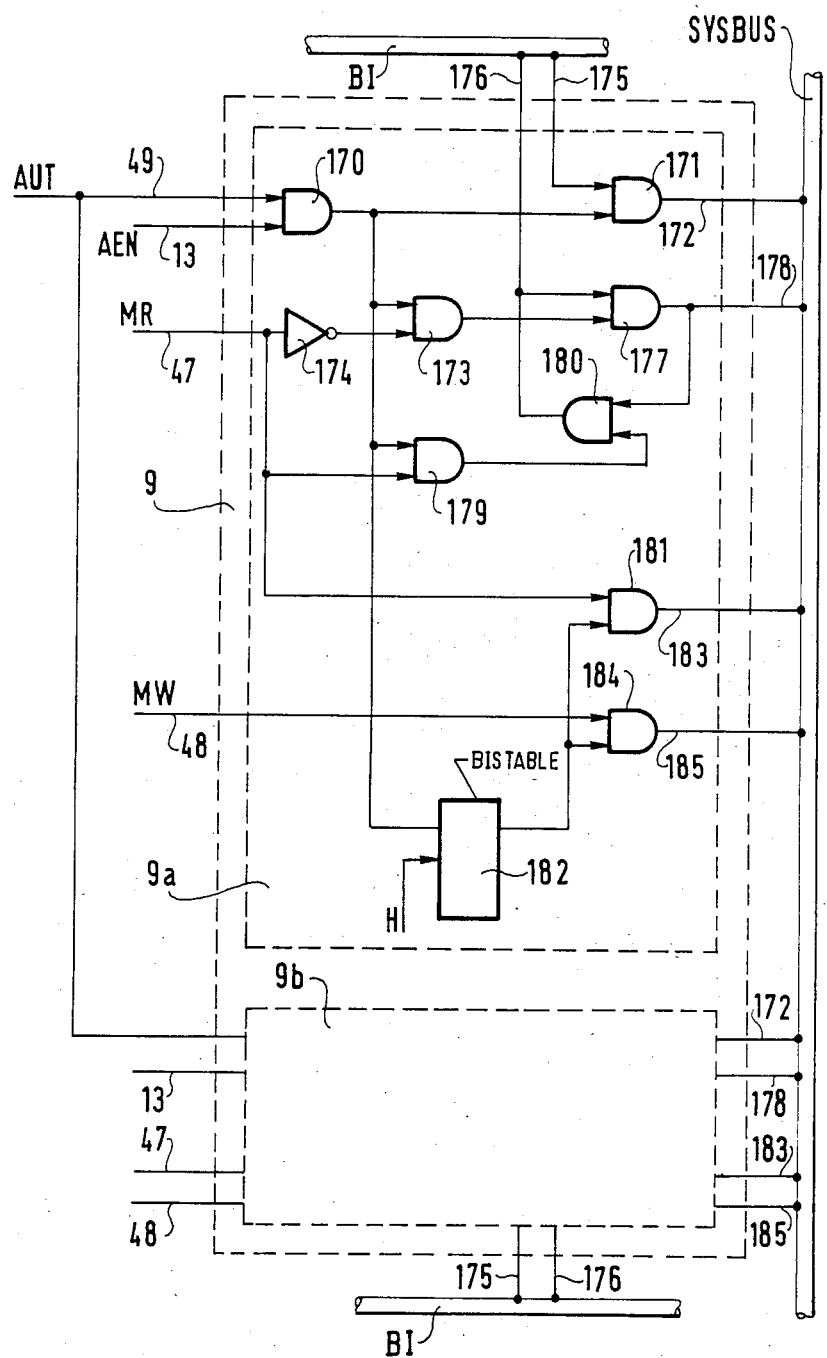
FIG. 14 shows an access circuit of FIG. 2.

FIG. 14 shows the access circuit 9 from FIG. 2; the access circuit comprises two identical circuits 9a and 9b, circuit 9a being assigned to signaling terminal TS0 and circuit 9b being assigned to signaling terminal TS1; only circuit 9a is shown in detail and described hereinafter. An AND gate 170 has one input connected by the line 49 to the terminal control unit which delivers an authorisation signal AUT to validate signals delivered by the DMA controller 4 of the signaling terminal and another input connected by the link 13 to the DMA controller 4 from which it receives an Address Enable, Output signal AEN. An AND gate 171 has one input connected to the output of the AND gate 170 and another input connected by an address link 175 to the internal bus BI from which it receives addresses; the output of the AND gate 171 is connected by an address line 172 to the system bus SYSBUS. An AND gate 173 has one input connected to the output of the AND gate 170 and one input connected to the output of an inverter 174 whose input is connected by the read line 47 to the DMA controller 4 from which it receives a Memory Read, Output signal MEMR (MR). An AND gate 177 has one input connected to the output of the AND gate 173 and another input connected by a data link 176 to the internal bus BI from which it receives data; the output of the AND gate 177 is connected by a data line 178 to the system bus SYSBUS. An AND gate 179 has one input connected to the output of the AND gate 170 and another input connected to the read line 47. An AND gate 180 has its output connected to the internal bus BI via the data link 176; it has an input connected to the data line 178 and another input connected to the output of the AND gate 179. An AND gate 181 has one input connected to the read line 47 and another input connected to the output of a bistable 182; the output of the AND gate 181 is connected by a read line 183 to the system bus SYSBUS.

An AND gate 184 has one input connected to the output of the bistable 182 and another input connected by the write line 48 to the DMA controller 4 from which it receives a Memory Write, Output signal MEMW (MW); the output of the AND gate 184 is connected by a write line 185 to the system bus SYSBUS. The bistable 182 has its input connected to the output of the AND gate 170 and its clock input receives the clock signal H.

Circuit 9b, which is identical to circuit 9a, is also connected to the wire 49 common to the two circuits 9a and 9b; it is connected to the DMA controller 4 of the signaling terminal TS1 by the link 13, the read line 47 and the write line 48 associated with this signaling terminal; it is naturally linked to the internal bus BI of the signaling terminal TS1 and to the system bus SYSBUS.

Figure 15:
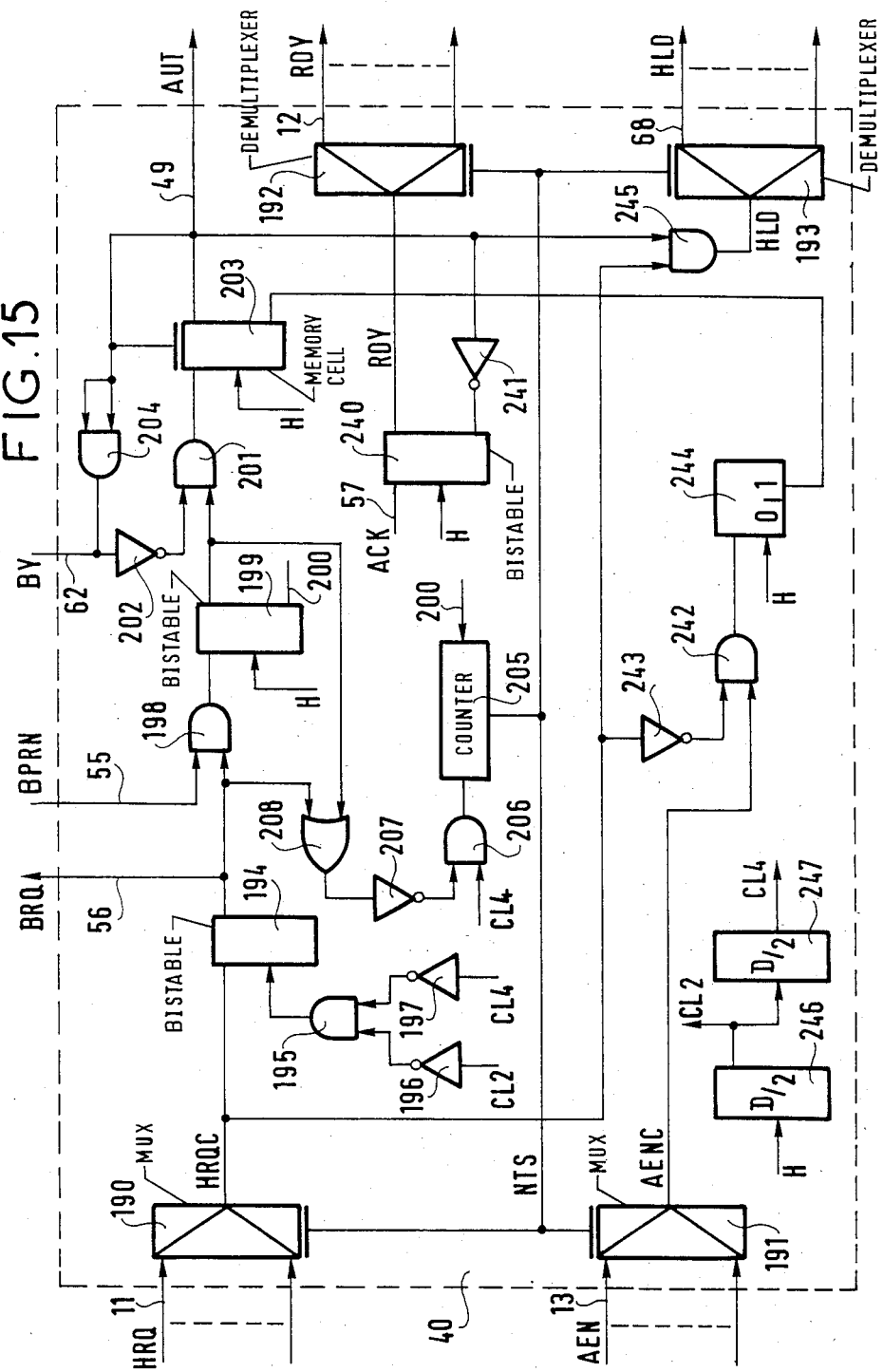
FIG. 15 shows a scanning module of the terminal control unit shown in FIG. 3.

FIG. 15 shows the scanning module 40 of the terminal control unit shown in FIG. 3. The terminal control unit controls eight signaling terminals and the scanning module is connected to each of the eight terminals by two multiplexers 190, 191 and two demultiplexers 192, 193; thus each multiplexer and each demultiplexer is connected to the signaling terminal by eight links. The multiplexer 190 has its input side connected to the terminals by request links 11, one for each terminal, each link carrying a Hold Request, Output signal HRQ emitted by the DMA controller 4 of the terminal in question. The multiplexer 191 has its input side connected to the terminals by address output links 13, one for each terminal, each link carrying the address enable signals AEN from the DMA controller 4 of the terminal in question. The demultiplexer 192 has its output side connected to the DMA controller 4 of the terminals by links 12, one for each terminal, each link carrying a ready signal RDY. The demultiplexer 193 has its output side connected to the internal bus access circuits 7 of the terminals by acknowledge links 68, one for each terminal, each link carrying an acknowledge signal HLD in response to a request signal HRQ (link 11).

A bistable 194 has a signal input connected to the output of the multiplexer 190 and a clock input connected to the output of an AND gate 195 receiving on its inputs the timing signals CL2 and CL4 via inverters 196 and 197; the output of the bistable 194 is connected by the bus request link 56 to the system bus SYSBUS and to an input of an AND gate 198; the bistable delivers a bus request signal BRQ on the link 56. Another input of the AND gate 198 is connected by the priority acknownledge link 55 to the system bus SYSBUS and receives from it a priority acknowledge signal BPRN; the output of the AND gate 198 is connected to a signal input of a bistable 199 which receives the clock signal H on its clock input; the reset input of the bistable is connected by the wire 200 to the microprocessor 33 of the terminal control unit. An AND gate 201 has one input connected to the link 62 through an inverter 202, the link 62 being connected to the system bus SYSBUS and carrying a bus busy signal BY; another input of the AND gate 201 is connected to the output of the bistable 199. A memory cell 203 has its input connected to the output of the AND gate 201 and its clock input receives the clock signal H; the output of the memory cell 203 is connected to the four access circuits 9 connecting the terminals to the terminal control unit by the authorization line 49 which carries an authorization signal AUT and to a hold input of the memory cell 203 and through a unidirectional gate 204 to the link 54; the unidirectional gate 204 is an AND gate with two inputs connected together.

A 3-bit counter 205 has its clock input connected to the output of an AND gate 206 having one input connected through an inverter 207 to the output of an OR gate 208 and another input which receives the clock signal H4. The OR gate 208 has one input connected to the output of the bistable 194 and another input connected to the output of the bistable 199; the parallel output of the counter 205 is connected to the select input of each of the multiplexer 190 and 191 and that of each of the demultiplexers 192 and 193, to which the counter delivers the numbers 0 to 7; the counter 205 is disabled through the OR gate 208 when the multiplexer 190 delivers a request signal HRQC, and this disabling is prolonged by one period of clock H by the signal delivered by the bistable 199.

A bistable 240 has its input connected to the system bus SYSBUS by the acknowledge link 57, which delivers a write or read acknowledge signal ACK, and a clock input receiving the clock signal H; the output of the bistable 240 is connected to the input of the demultiplexer 192 and delivers a ready signal RDY; the reset input of the bistable 240 is connected to the output of the memory cell 203 through an inverter 241. An AND gate 242 has one input connected to the output of the multiplexer 191 and another input connected through an inverter 243 to the output of the multiplexer 190; the output of the AND gate 242 is connected to the input of a 2-bit serial shift register 244, the second bit output of which is connected to a reset input of the memory cell 203; the clock input of the shift register 244 receives the signal H. An AND gate 245 has one input connected to the output of the memory cell 203 and another input connected to the output of the multiplexer 190; the output of the AND gate 245 is connected to the input of the demultiplexer 193 and delivers an acknowledge signal HLD in response to a request signal HRQ emitted by a DMA controller 4 of one of the eight signaling terminals TS controlled by the terminal control unit UG.

Two dividers by two 246 and 247 are used to derive the signal CL2 and CL4 from the clock signal H delivered by the telecommunication exchange; the clock signal H is applied to the divider by two 246, the output of which delivers the signal CL2 and is connected to the input of the divider by two 247 which delivers the signal CL4; the signals CL2 and CL4 are used in the terminal control unit UG.

There will now be described an example of an interchange between a signaling terminal and the terminal control unit in the case where, for example, the receiver 6 of the terminal receives one byte over the link L. The receiver sends a transfer request to the DMA controller 4 via the internal bus access circuit 7 (FIG. 4) and the signaling link changeover circuit 8 (FIG. 5). The DMA controller immediately delivers a Hold Request, Output signal HRQ on the request link 11. In the scanning module 40 (FIG. 15) of the terminal control unit UG, when the counter 205 delivers the number of the requesting signaling terminal, the multiplexer 190 transmits the request HRQ and the bistable 194 delivers a bus request signal BRQ on the bus request link 56 to request access to the system bus SYSBUS; the signal BRQ is also used to lock the counter 205 on the number of the requesting signaling terminal. When the system bus SYSBUS assigns priority to the requesting terminal, it delivers a priority acknowledge signal BPRN; when the system bus SYSBUS is free the busy signal BY goes to zero on the link 62 and the system bus SYSBUS is then assigned to the requesting signaling terminal; the memory cell 203 (FIG. 15) delivers an authorization signal AUT on the line 49, this signal serving also to latch the memory cell and to deliver a busy signal BY, of value 1, on the link 62. Also, the demultiplexer 193 which is controlled by the counter 205 delivers on the acknowledge link 68 of the requesting signaling terminal the transfer request acknowledge signal HLD.

In the requesting signaling terminal, the signal HLD gives the receiver access to the internal bus BI and the DMA controller first reads the received byte in the receiver 6 and then delivers on the line 13 the address enable signal AEN authorizing the output of its transfer addresses and the sending of these on the system bus SYSBUS (FIG. 14); the memory access circuit 4 also delivers a memory write signal MW over the write line 48 to the access circuit 9 to write data via the system bus SYSBUS into the main memory MC (FIG. 1). When the write operation has been effected the main memory MC returns to the scanning module 40 an acknowledge signal ACK from the system bus SYSBUS on the link 57, which results in the sending of the ready signal RDY to the requesting terminal in which it causes the hold request signal HRQ and the address enable signal AEN to be reset; the resetting of these signals results in the resetting in the scanning module of the authorization signal AUT and the bus request signal BRQ; the system bus SYSBUS is released and the counter 205 resumes its counting cycle.

Figure 16:
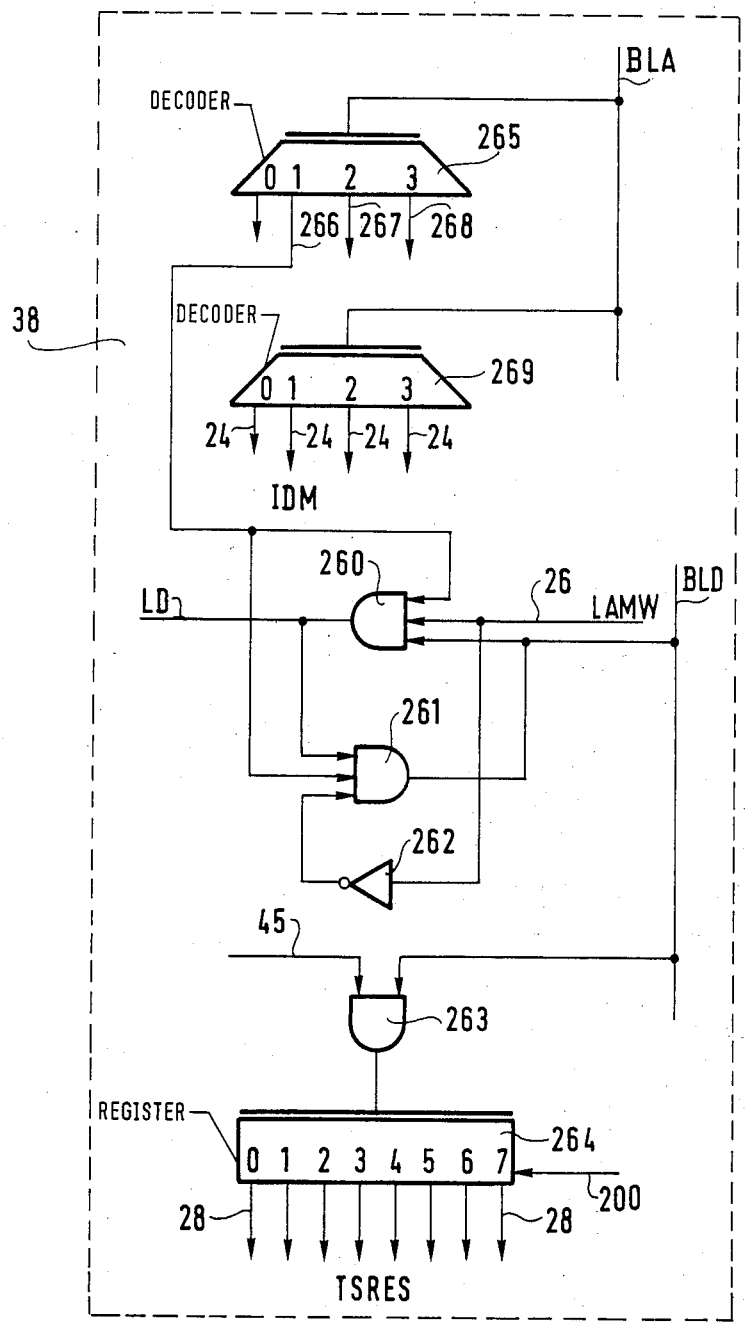
FIG. 16 shows a second interface of FIG. 3.

FIG. 16 shows the second interface 38 from FIG. 3. A decoder 265 has its input connected to the local address bus BLA and receives two bits from the microprocessor 33; on its output side the decoder delivers on a wire 266 a signal enabling interchange over the data line LD, on a wire 267 a signal enabling the random access memory 36, and on a wire 268 a signal enabling the read only memory 37. A decoder 269 has its input connected to the local address bus BLA and receives two address bits relating to the four interchange circuits 10 connecting the terminal control unit to the eight signaling terminals; these two bits therefore provide for sending a signal to one of four interchange circuits; each of the four outputs 0, 1, 2 and 3 of the decoder is connected by a link 24 to an interchange circuit 10, the signal carried by a link 24 being the decode control signal IDM (FIGS. 3 and 10); the decode control signal IDM is therefore delivered to only one of the four interchange circuits. An AND gate 260 has one input connected to the local data bus BLD and another input connected by the link 26 to the local bus controller 31; its output is connected to the data line LD; another AND gate 261 has one input connected to the data line LD and another input connected through an inverter 262 to the link 26 carrying a write control signal LAMW; another input of each of the AND gates 260 and 261 is connected to the wire 266 from the output of the decoder 265. An AND gate 260 has one input connected to the local data bus BLD and another input connected by the line 45 to the local bus controller 41 which delivers a write signal; an eight-bit register 264 receives from the local data bus BLD eight bits each relating to one signaling terminal, each bit providing for the resetting of the units of the corresponding terminal; on the output side of the register 264 there are therefore eight links 28, one for each terminal, since the terminal control unit controls eight terminals, each link carrying a reset signal TSRES when the corresponding bit has the value 1; thus the terminal control unit can command the resetting of one or more terminals, or of all terminals simultaneously. The register 264 has a reset input connected to the wire 200 (FIG. 3) to provide for resetting of the terminal control unit by the microprocessor 33.

Figure 17:
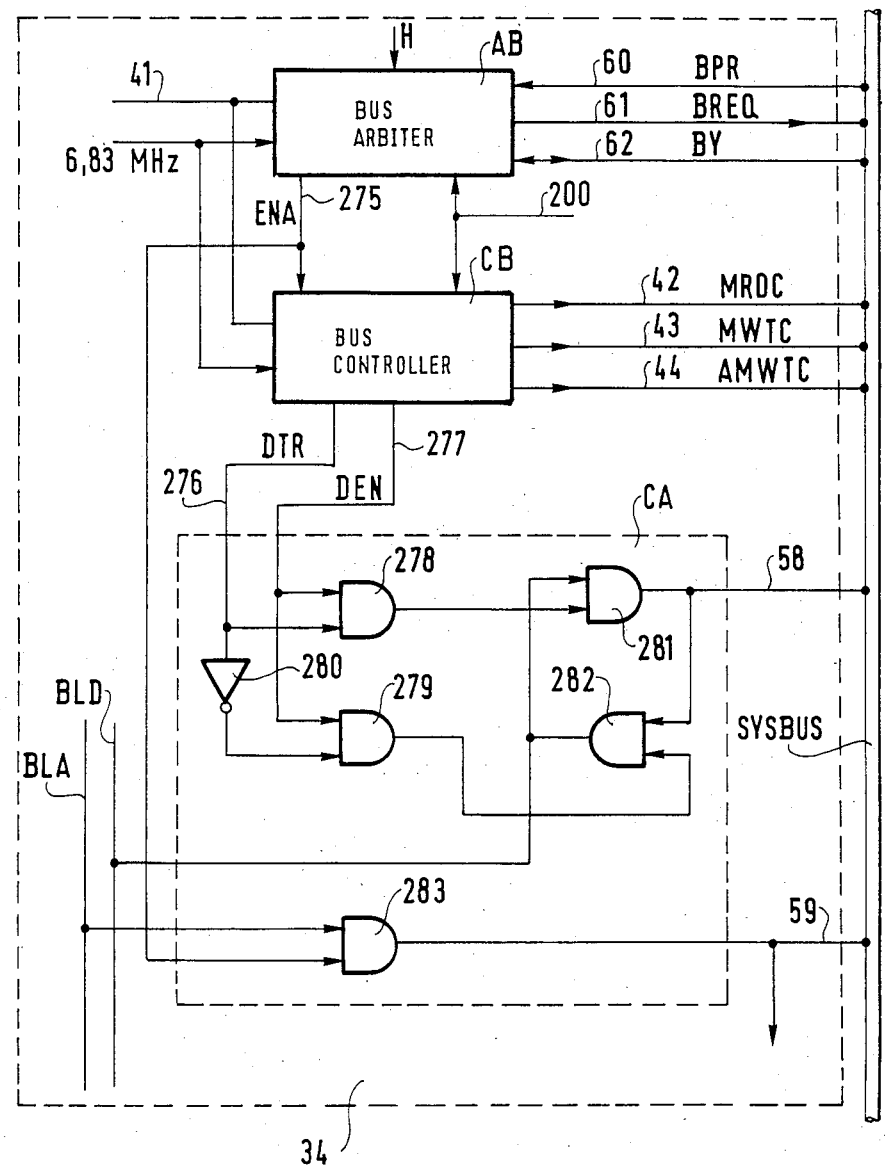
FIG. 17 shows a first interface of FIG. 3.

FIG. 17 shows the first interface 34 from FIG. 3. The bus arbiter AB and the bus controller CB are connected to the microprocessor 33 by the status link 41 and receive the 6.83 MHz clock signal from the clock 30; the bus arbiter AB also receives the clock signal H from the exchange.

The bus arbiter AB is connected by an address output line 275 to the bus controller CB and to the access circuit CA, and delivers on this line an address enable signal ENA; it is also connected to the system bus SYSBUS by the links 60, 61 and 62; over the priority acknowledge link 60 it receives a priority acknowledge signal BPR, over the bus request link 61 it sends a bus request signal BREQ, and over the bidirectional busy link 62 it sends or receives a system bus SYSBUS busy signal BY. The bus controller CB is connected to the system bus SYSBUS by the links 42, 43 and 44; the controller sends over the read link 42 a memory read command signal MRDC, over the write link 43 a memory write command signal MWTC and over the control link 44 an advanced memory write command signal AMWTC. The bus controller CB is connected to the access circuit CA by a data enable line 276 over which it delivers a data transmit/receive signal DTR and by a data transfer command line 277 over which it delivers a data enable signal DEN.

The access circuit CA includes an AND gate 278 having one input connected to the line 276 and another input connected to the line 277, and an AND gate 279 having one input connected via an inverter 280 to the line 276 and another input connected to the line 277; an AND gate 281 has one input connected to the output of the AND gate 278 and another input connected to the local data bus BLD, its output being connected to the system bus SYSBUS by the data link 58; an AND gate 282 has one input connected to the data link 58 and another input connected to the output of the AND gate 279, its output being connected to the local data bus BLD; an AND gate 283 has one input connected to the local address bus BLA and another input connected to the line 275, its output being connected to the system bus SYSBUS by the address link 59. The microprocessor can access the system bus SYSBUS by means of the bus controller CB and the bus arbiter AB which generate the necessary signals. On a request from the microprocessor 33 the bus arbiter sends a bus request signal BREQ and receives in response a priority acknowledge signal BPR if the system bus SYSBUS is free; when the signal BPR is received and when the system bus SYSBUS is free (BY=0) the bus arbiter sends a busy signal BY to reserve the bus.

The access circuit CA is used to send data and addresses or to receive data from the system bus SYSBUS, according to whether the microprocessor 33 wishes to access the memories 36 and 37 or the interchange memory 92, or the main memory MC through the intermediary of the system bus SYSBUS, that is to say using either the local bus controller 31 (access to memories 36, 37 and 92) or the bus controller CB to generate the appropriate write or read signals.

Figure 18:
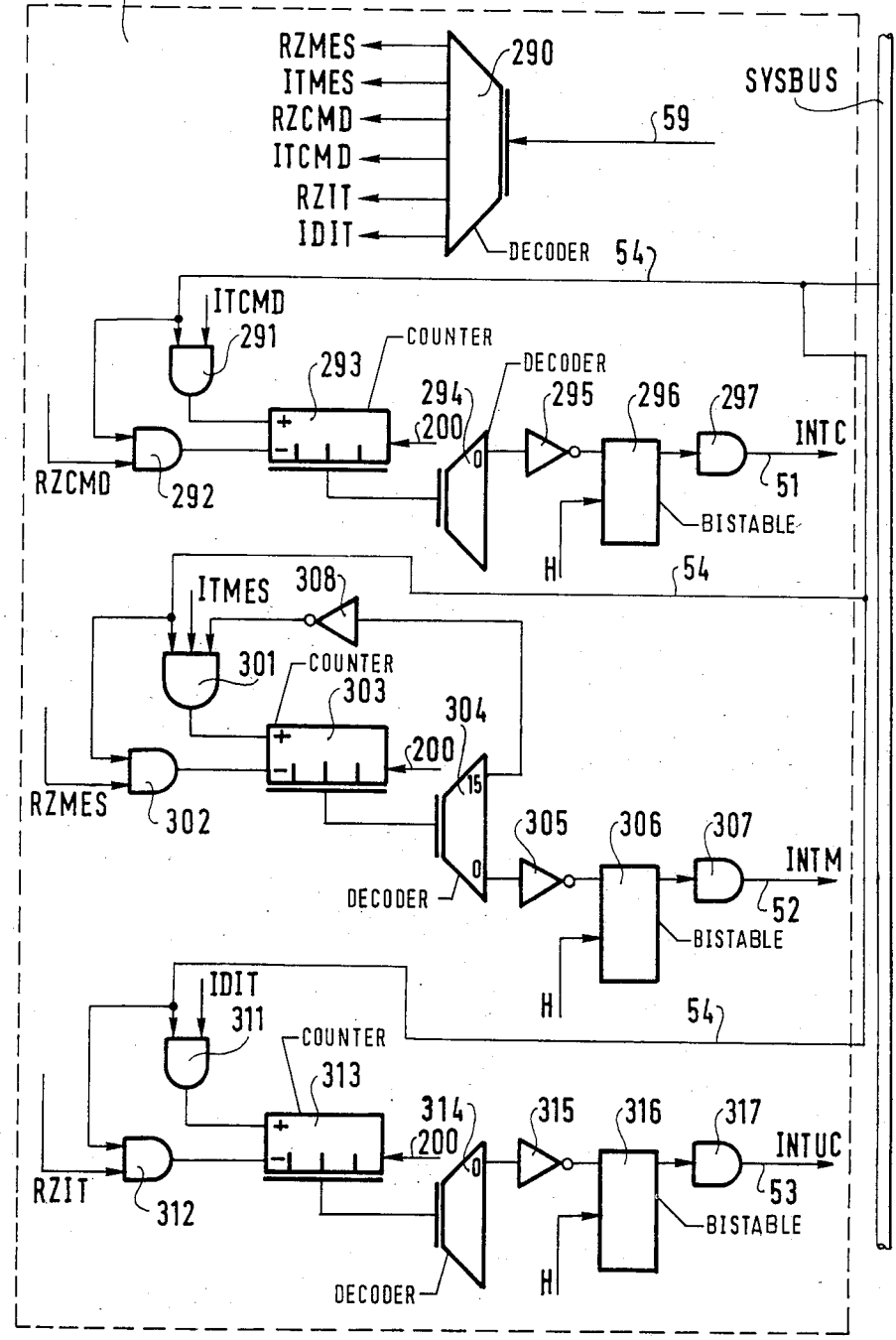
FIG. 18 shows an interrupt circuit of FIG. 3.

FIG. 18 shows the interrupt circuit 39 from FIG. 3. A decoder 290 has its input connected to the address link 59 (FIG. 17); by decoding the less significant bits of the addresses on the address link, the decoder delivers the addresses RZMES, ITMES, RZCMD, ITCMD, RZIT, IDIT. A first interrupt circuit comprises two AND gates 291 and 292, a 4-bit counter 293, a decoder 294, an inverter 295, a bistable 296 and an isolating gate 297. The AND gate 291 has one input connected by the link 54 to the system bus, another input connected to the decoder 290 from which it receives the address ITCMD and its output connected to the increment input of the counter 293. The AND gate 292 has one input connected to the link 54, another input connected to the decoder 290 from which it receives the address RZCMD and its output connected to the decrement input of the counter 293; the output of the counter is connected to the input of the decoder 294 of which the "0" output is connected via the inverter 295 to the input of the bistable 296 which is clocked by the clock signal H; the output of the bistable is connected to the link 51 through the isolating gate 297. A reset input of the counter 293 is connected to the wire 200 (FIG. 3) so that it can be reset to zero by the microprocessor 33.

A second interrupt circuit comprises two AND gates 301 and 302, a counter 303, a decoder 304, an inverter 305, a bistable 306, an isolating gate 307 and an inverter 308.

The AND gate 301 has one input connected by the link 54 to the system bus, another input connected to the decoder 290 from which it receives the address ITMES and its output connected to the increment input of the counter 303. The AND gate 302 has one input connected to the link 54, another input connected to the decoder 290 from which it receives the address RZMES and its output connected to the decrement input of the counter 303; the output of the counter 303 is connected to the input of the decoder 304 of which the "0" output is connected via the inverter 305 to the input of the bistable 306 and the "15" output is connected via the inverter 308 to another input of the AND gate 301. The bistable 306 is clocked by the clock signal H and its output is connected to the link 52 through the isolating gate 307. A reset input of the counter 303 is connected to the wire 200 (FIG. 3) so that it can be reset to zero by the microprocessor 33.

A third interrupt circuit comprises two AND gates 311 and 312, a counter 313, a decoder 314, an inverter 315, a bistable 316 and an isolating gate 317. The AND gate 311 has one input connected by the link 54 to the system bus, another input connected to the decoder 290 from which it receives the address IDIT and its output connected to the increment input of the counter 313. The AND gate 312 has one input connected to the link 54, another input connected to the decoder 290 from which it receives the address RZIT and its output connected to the decrement input of the counter 313. The output of the counter 313 is connected to the input of the decoder 314 of which the "0" output is connected via the inverter 315 to the input of the bistable 316 which is clocked by the clock signal H. The output of the bistable 316 is connected to the link 53 by the isolating gate 317. A reset input of the counter 313 is connected to the wire 200 (FIG. 3) so that it can be reset to zero by the microprocessor 33.

The terminal control unit shown in FIG. 3 sends to the central control unit UC a command interrupt INTC on the link 51 and a message interrupt INTM on the link 52. The central control unit UC sends the terminal control unit a command interrupt INTUC which is delivered by the link 53 to the interrupt controller 35 (FIG. 3). A command interrupt signifies that the terminal control unit or the central control unit UC has placed a command relating to the signaling terminal in the appropriate interchange area in the main memory MC. A message interrupt signifies that the terminal control unit has placed a message in the queue of a signaling terminal in the main memory MC. These interrupts remain set as long as there is a command or a message to be acted on.

For the first interrupt circuit, the address ITCMD signifying the sending of a command to the central control unit UC results in the incrementing of the counter 293 and, in consequence, the sending of an interrupt on the link 51 which interrupts operation of the central control unit UC; after recognising the command, the central control unit delivers the address RZCMD which decrements the counter 293; as long as the counter is not at zero, the interrupt remains. The address ITCMD, decoded by the decoder 290, is sent by the terminal control unit over the link 59 (FIG. 17), this address being delivered by the microprocessor 33 of the terminal control unit.

For the second interrupt circuit, the address ITMES signifying the sending of a message to the central control unit UC causes the counter 303 to be incremented and, in consequence, the sending of an interrupt over the link 52 which interrupts operation of the central control unit UC; after recognition of the message the central control unit UC delivers the address RZMES which results in the decrementing of the counter 303, the interrupt remaining as long as the counter is not at zero. The address ITMES is delivered by the microprocessor 33 and sent over the link 59. The counter 303 is disabled on the decoder 304 decoding "15".

For the third interrupt circuit, the address IDIT signifying the sending of a command by the central control unit UC on the link 59 results in the incrementing of the counter 313 and, in consequence, the sending of an interrupt over the link 53 which interrupts operation of the microprocessor 33 of the terminal control unit. After recognizing the command the microprocessor delivers the address RZIT which results in the decrementing of the counter 313, the interrupt remaining as long as the counter is not at zero.

FIG. 19 shows a 64 byte area in the interchange memory 92 from FIG. 6 which shows the interchange circuit 10 from FIG. 2; as the interchange memory is common to two signaling terminals, it comprises two sections each of 64 bytes and each assigned to one terminal.

The various bytes are defined below:

Byte 0
This byte is reserved for an interrupt.
Byte 1
Backward indicator bit to be transmitted BIB-T (1 bit).
 Backward sequence number of next SU to be transmitted BSN-T (7 bits).
Bytes 2 to 7, transmit area
Byte 2
 Continuous transmission of one link status signaling unit LSSU (CTLSSU) (1 bit).
 4 bits not used.
 End of message FM (1 bit).
 Start of message DM (1 bit).
 Block to be transmitted present PBE (1 bit).
Byte 3
 Forward indicator bit to be transmitted FIB-T (1 bit).
 Forward sequence number of next SU to be transmitted FSN-T (7 bits).
Byte 4
 Signal unit length L0 (8 bits).
Byte 5
 L1 (8 bits): bytes 4 and 5 give the total length of the signal unit to be transmitted.
Byte 6
 Main memory address AD0 (8 bits).
Byte 7
 AD1 (8 bits): bytes 6 and 7 give the address in main memory of the signal unit to be transmitted.
Bytes 8 to 10, block entry area
Byte 8
 7 bits not used.
 1 bit PZR to indicate presence of free block for reception.
Byte 9
 Free block address ADBL0 (8 bits).
Byte 10
 ADBL1 (8 bits): bytes 9 and 10 give the free block address (in main memory).
Byte 11
 1 bit ITV to indicate reception of a fill-in signal unit.
 1 bit ITCR to indicate reception of a correct signal unit.
 5 bits not used.
 1 bit NACK signifying: detection of a negative acknowledgement to be transmitted.
Bytes 12 to 16, first receive area
Byte 12
 6 bits not used.
 1 bit LSSU to indicate a received link status signal unit.
 1 bit PM to indicate the presence of a receive message.
Byte 13
 1 bit not used.
 Forward sequence number received FSN-R (7 bits).
Byte 14
 L0/1 (8 bits).
Byte 15
 4 bits NBZU to indicate number of blocks received.
 3 bits not used.
 1 bit L1/1: this bit with byte 14 gives the length of the signal unit received.
Byte 16
 8 bits PZON which constitute the pointer to the first block of the message received in the received block queue (bytes 23 to 58).
Bytes 17 to 21, second receive area
Byte 17
 6 bits not used.
 1 bit LSSU to indicate a link status signal unit.
 1 bit PM to indicate the presence of a message.
Byte 18
 1 bit not used.
 Forward sequence number received FSN-R (7 bits).
Byte 19
 Frame length L0/2 (8 bits).
Byte 20
 4 bits NBZU to indicate number of blocks.
 3 bits not used.
 1 bit L1/2: this bit with byte 19 gives the length of the signal unit received.
Byte 21
 8 bits PZON which constitute the pointer to the first block of the message received in the received block queue (bytes 23 to 58).
Byte 22
 Backward indicator bit received BIB-R (1 bit).
 Backward sequence number received BSN-R (7 bits).
Bytes 23 to 58, receive block queue
 These bytes represent the addresses of the consecutive blocks used to receive the signal units (receive block queue).
Byte 59
 8 bits FSN-O which indicate the forward sequence number of the oldest message signal unit in the retransmission buffer.
Byte 60
 1 bit BMR to activate (0 to 1 transition) or deactivate (1 to 0 transition) reception.
 1 bit BRET with value 1 when the signaling terminal must reject any fill-in or message signal unit.
 3 bits not used.
 1 bit ISUERM with value 1 for activation of signal unit error rate monitor.
 1 bit BVS with value 1 to indicate alignment emergency status.
 1 bit IAERM with value 1 for activation of alignment error rate monitor.
Byte 61
 1 bit SA to indicate alignment error limit.
 4 bits not used.

1 bit OREC to indicate receive origin of terminal failure.

1 bit OSUERM to indicate failure caused by excessive error rate of signal unit error rate monitor.

1 bit CD to indicate a faulty signaling link.

Byte 62

8 bits reserved for an error code and for tests.

Byte 63

8 bits not used.

Transmit operation.

Message signal unit transmission.

Level 3 of the system (that is the central control unit UC) indicates to the terminal control unit (UG1, for example) that a message must be sent by a given signaling terminal. The terminal control unit writes into the transmit area of the interchange memory 92 of the interchange circuit 10, that is to say into bytes 2 to 7 of the half of the interchange memory assigned to the given terminal:

the forward sequence number of the next SU to be transmitted FSN-T and the forward indicator bit to be transmitted FIB-T the total length of the signal unit to be transmitted L0, L1, the address AD0, AD1 of this signal unit in the main memory MC.

The terminal control unit UG1 then sets bits FM, DM and PBE (byte 2).

The backward sequence number of the next SU to be transmitted BSN-T (byte 1) is regularly updated by the terminal control unit and acted on cyclically by the signaling terminal. The terminal routinely reads bit PBE; when it finds it at 1, signifying the presence of a block to send, it acquires the various data present and resets bit PBE to zero. The terminal then arms the non-active transmit signaling link of the DMA controller 4 with the address AD0, AD1 (bytes 6 and 7) and then, during the subsequent processing of the transmit interrupt, it arms the sender 5 by providing it with the signal unit length L0, L1 (bytes 4 and 5), the forward sequence number of the next SU to be transmitted FSN-T (seven bits of byte 3) and the bit FIB-T (byte 3), and the backward sequence number of the next SU to be transmitted BSN-T (seven bits of byte 1) and the bit BIB-T (byte 1), and then switches over to the previously armed signaling link. For a message signal unit comprising a number of blocks, the terminal control unit UG1 passes the blocks in succession to the terminal, which is to say that for the blocks other than the first the terminal control unit passes on only the block address AD0, AD1 and the bits FM, DM and PBE (FM=1 if end of message, DM=1 if start of message, PBE=1 if block to send present).

Link Status signal unit transmission.

The transmission of a link status signal unit is repeated until there is a change of state. The terminal control unit carries out the same operation as for a message signal unit of one block, but sets bit CTLSSU to 1 (continuous transmission of link status signal unit). When the microcontroller of the terminal finds bits PBE (block to send present) and CTLSSU at 1, it prepares to send the link status signal unit, sets bit PBE to 0 and repeats the transmission of this signal unit until it finds bit PBE reset to 1 or bit CTLSSU reset to 0.

Fill-in signal unit transmission.

In the absence of message or status signal units to be transmitted, the microcontroller of the terminal arms sending of a fill-in signal unit. The parameters associated with a fill-in signal unit of this kind are the forward sequence number FSN-T sent in the preceding signal unit and the backward sequence number BSN-T sent, these numbers being read in the interchange memory. The address of the memory block reserved for sending a fill-in signal unit (in the main memory MC) is known to the microcontroller. The same transmission signaling link of the DMA controller 4 is used for transmission of consecutive fill-in signal units.

Receive operation.

When a receive signaling link of the DMA controller 4 is found inactive, non-armed, the microcontroller of the signaling terminal arms it for a free block of 30 bytes. It is provided for this purpose with an internal queue of free block addresses and is regularly supplied with available blocks by the terminal control unit via the interchange memory 92. Changeover from one receive signaling link to the other occurs at the end of each message and at the end of each block of 30 bytes received.

The microcontroller is interrupted by the receiver 6 at the end of reception of a signal unit; after checking the validity of this signal unit and after actuating the error counters appropriately, it determines the type of signal unit (message, status or fill-in) by means of the signal unit length as provided by the receiver and the number of blocks used for its reception; it then checks the consistency of the backward sequence number BSN-R, the forward sequence number FSN-R and the BIB-R bit received.

Message signal unit received.

The microcontroller then places the data which is of use to the terminal control unit in one of the two receive areas of the interchange memory (bytes 12 to 16 or 17 to 20), these two receive areas being used alternately. This data comprises:

the forward sequence number FSN-R received, the length of the signal unit received (9 bits: L0/1 and L1/1) and the number of blocks received NBZU, the indication of the pointer to the first block in the queue PZON.

Finally, the microcontroller sets bit PM to 1 to indicate the presence of a message and bit LSSU to 0 since it is not a status signal unit; it then sends an interrupt to the terminal control unit via the interrupt generator I (FIGS. 6 and 13), this interrupt being received by the interrupt controller 35 of the terminal control unit (FIG. 3). If the message comprises a number of blocks, the addresses of the consecutive blocks used to receive it are located in the receive block queue (bytes 23 to 58) after the address of the first block.

Link status signal unit received.

The procedure is the same as for reception of a message signal unit, except that the microcontroller also sets bit LSSU to 1.

Fill-in signal unit received.

The procedure is the same as previously, except that bits PM and LSSU remain at zero and only bit ITV indicating that it is a fill-in signal unit is set to 1 (byte 11). The microcontroller of the terminal recovers the addresses of the memory blocks used for reception of the fill-in signal unit and those used for a signal unit found to be incorrect after checking, placing these addresses in the internal queue of available block addresses.

Finally, the backward sequence number received BSN-R and the backward indicator bit BIB-R received are updated on each fill-in or message signal unit received and bit NACK, the negative transmission acknowledgement (byte 11), is set by the microcontroller, if necessary.

The operation described is the same for the two signaling terminals TS0 and TS1 of FIG. 2 which share the interchange circuit 10 shown in FIG. 6, access to the interchange memory 92, that is to say addressing of the latter, being controlled by the multiplex signal circuit B which enables the two terminals and the terminal control unit to access the interchange memory 92 on a cyclic basis.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A signaling terminal system for the CCITT No. 7 common channel signaling system, comprising a plurality of groups of signaling terminals adapted to be connected to a telecommunication exchange's switching network, a respective terminal control unit for each of said groups of signaling terminals, a central control unit, a main memory, a system bus connecting said signaling terminals and said terminal control units to said central control unit and said main memory, each group of signalling terminals having at least one access circuit connecting said signaling terminals to said system bus, and at least one interchange circuit connecting said signaling terminals to said respective terminal control unit.

2. A system according to claim 1, wherein each signaling terminal comprises:
    a microcontroller,
    a sender,
    a receiver,
    an internal bus access circuit,
    a signaling link changeover circuit,
    a DMA controller,
    an internal bus interconnecting said microcontroller, said sender, said receiver, said DMA controller and said access circuit associated with said signaling terminal,
    a bidirectional link adapted to connect said sender and said receiver to said switching network,
    a link connecting said sender and said receiver to said internal bus access circuit and said signaling link changeover circuit,
    a transmit interrupt link connecting said sender to said microcontroller,
    a receive interrupt link connecting said receiver to said microcontroller,
    means connecting said internal bus access circuit to said microcontroller, to said signal link changeover circuit and to said DMA controller,
    an acknowledgement link adapted to connect said internal bus access circuit to said terminal control unit associated with the group of which the signaling terminal forms part,
    means connecting said signaling link changeover circuit to said microcontroller and to said DMA controller,
    an address line and a data line connecting said microcontroller to said interchange circuit,
    a read line, a write line and an address enable line adapted to connect said DMA controller to access circuit associated with said signaling terminal,
    a reset link adapted to connect said sender, said receiver, said microcontroller, and said DMA controller to said terminal control unit associated with the group of which the signaling terminal forms part,
    a request line and a ready line and said address enable line adapted to connect said DMA controller to said terminal control unit associated with the group of which the signaling terminal forms part,
    means adapted to connect said access circuit associated with the signaling terminal to said system bus,
    an authorization line adapted to connect said access circuit associated with the signaling terminal to said terminal control unit associated with the group of which the signaling terminal forms part, and
    an address bus, a data bus, a decode control link, a read control link, a write control link, a terminal ready link and an interrupt link adapted to connect said interchange circuit to said terminal control unit associated with the group of which the signaling terminal forms part.

3. A system according to claim 2, comprising a respective access circuit and a respective interchange circuit associated with each pair of signaling terminals and wherein each of said interchange circuits comprises an interchange memory comprising two parts each associated with a respective signaling terminal of said pair and having its input and output sides connected to said pair of signaling terminals by said data lines and to said terminal control unit associated with the group of which said pair of signaling terminals forms part by said data bus, and an interchange memory addressing circuit adapted to be connected to said pair of signaling terminals by said address lines and to said terminal control unit associated with the group of which said pair of signaling terminals forms part by said address bus.

4. A system according to claim 2, wherein each terminal control unit comprises:
    a microprocessor,
    a local bus controller,
    a first interface,
    a programmable interval timer,
    an interrupt controller,
    a second interface,
    a random access memory,
    a read only memory,
    an interrupt circuit,
    a scanning module,
    a local data bus connecting said microprocessor to said first interface, to said programmable interval timer, to said interrupt controller, to said random access memory, to said read only memory and to said second interface,
    a local address bus connecting said microprocessor to said first interface, to said random access memory, to said read only memory, to said second interface, to said interrupt controller and to said address bus connecting said terminal control unit to said interchange circuits, and
    a status link connecting said microprocessor to said local bus controller and said first interface, read and write control links connecting said local bus controller to said interchange circuit, and a write signal line and said write control link connecting said local bus controller to said second interface, wherein said local bus controller is connected to said programmable interval timer and said interrupt controller by said write signal line, to said random access memory and said read only memory by said read control link and to said random access memory by said write control link, said second interface is connected to said interchange circuits by said data bus and said decode control link and to said signaling terminals by said reset link, said first interface is connected to said system bus, said interrupt circuit is connected to said system bus, to said interrupt controller and to said main memory, and said scanning module is connected to said DMA controllers and said internal bus access circuits of said signaling terminals, to said access circuits and to said system bus.

5. A system according to claim 4, wherein said first interface comprises a bus controller, a bus arbiter and an access circuit, and further comprising:

an address link connecting said bus controller and said bus arbiter to said microprocessor, an address enable line connecting said bus arbiter to said bus controller and said access circuit, a priority acknowledgement link, a bus request link and a busy link connecting said bus arbiter to said system bus, a data enable line and a data transfer command line connecting said bus controller to said access circuit, a read link, a write link and a write control link connecting said bus controller to said system bus, and a data link and an address link connecting said access circuit to said local data bus, said local address bus and said system bus.

6. A system according to claim 4, wherein each of said scanning modules comprises:

a first multiplexer, a request link adapted to connect the input of said first multiplexer to each signaling terminal of the associated group, a second multiplexer, an address enable link adapted to connect the input of said second multiplexer to each signaling terminal of the associated group, a first demultiplexer, a ready link adapted to connect the output of said first demultiplexer to each signaling terminal of the associated group, a second demultiplexer, an acknowledgement link adapted to connect the output of said second demultiplexer to each signaling terminal of the associated group, a first bistable connected to the output side of said first multiplexer, a bus request link adapted to connect the output of said first bistable to said system bus, a first AND gate having a first input connected to the output of said first bistable, a priority acknowledge link adapted to connect a second input of said first AND gate to said system bus, a second bistable connected to the output of said first AND gate, a second AND gate having a first input connected to the output of said second bistable, an inverter and a busy link adapted to connect a second input of said second AND gate to said system bus, a memory cell connected to the output of said second AND gate, an authorization line adapted to connect the output of said memory cell to said access circuits, a third AND gate having a first input connected to the output of said second multiplexer, a first inverter connecting a second input of said third AND gate to the output of said first multiplexer, a serial shift register connected to the output of said third AND gate, a reset input of said memory cell connected to the output of said serial shift register, a third bistable having its output connected to the input of said first demultiplexer, an acknowledge link adapted to connect the input of said third bistable to said system bus, a second inverter connecting a reset input of said third bistable to the output of said memory cell, a counter, and enable inputs of said first and second multiplexers and demultiplexers connected to the output of said counter.

* * * * *